(12) United States Patent
Sucre

(10) Patent No.: US 10,968,058 B2
(45) Date of Patent: Apr. 6, 2021

(54) U RECLAIMER UTILITY DEVICE APPARATUS

(71) Applicant: Luis Sucre, Plano, TX (US)

(72) Inventor: Luis Sucre, Plano, TX (US)

( * ) Notice: Subject to any disclaimer, the term of this patent is extended or adjusted under 35 U.S.C. 154(b) by 164 days.

(21) Appl. No.: 15/932,403

(22) Filed: Feb. 26, 2018

(65) Prior Publication Data

US 2019/0031454 A1 Jan. 31, 2019

Related U.S. Application Data

(60) Provisional application No. 62/605,060, filed on Jul. 31, 2017.

(51) Int. Cl.
| | |
|---|---|
| *B65G 67/06* | (2006.01) |
| *B65G 65/06* | (2006.01) |
| *B65G 3/04* | (2006.01) |
| *B65G 53/04* | (2006.01) |
| *B65G 53/48* | (2006.01) |
| *B65G 69/20* | (2006.01) |

(52) U.S. Cl.
CPC .............. *B65G 67/06* (2013.01); *B65G 65/06* (2013.01); *B65G 3/04* (2013.01); *B65G 53/04* (2013.01); *B65G 53/48* (2013.01); *B65G 69/20* (2013.01); *B65G 2201/042* (2013.01)

(58) Field of Classification Search
CPC ........ B65G 65/06; B65G 65/38; B65G 67/06; B65G 65/28; B65G 69/0416
USPC ......... 414/142.2, 142, 6, 305, 313, 325, 327
See application file for complete search history.

(56) References Cited

U.S. PATENT DOCUMENTS

| | | | | |
|---|---|---|---|---|
| 719,119 | A * | 1/1903 | Hurry et al. ........... | B65G 65/00 414/305 |
| 822,547 | A * | 6/1906 | Nicolson ................ | B65G 65/38 414/313 |
| 826,646 | A * | 7/1906 | Blaisdell .............. | B65G 63/008 414/268 |
| 844,693 | A * | 2/1907 | Seidel, Jr. ............. | B65G 65/44 414/325 |

(Continued)

FOREIGN PATENT DOCUMENTS

| | | | | |
|---|---|---|---|---|
| GB | 1225569 A | * | 3/1971 | ............. E02F 3/181 |
| JP | 55161731 A | * | 12/1980 | ............. B65D 63/00 |

(Continued)

*Primary Examiner* — James Keenan
(74) *Attorney, Agent, or Firm* — Librado Tena

(57) ABSTRACT

The present invention is a new apparatus to efficiently reclaim cement from a horizontal warehouse. This new reclaiming apparatus combines a mechanical cement reclaiming machine, a U Reclaimer Utility Device Apparatus, together with a reduced amount of open air slides, cement is pushed by a rotating chain with rakes on said reclaiming machine, cement is further fluidized through a porous media with low pressure air, cement flow is achieved by sloping said air slides to match the fluidized angle of repose of the powdered material. Further, the present invention introduces a conveying system, composed by a cascade of enclosed air slides and elevator machines, to convey the cement from the reclaiming area to the dispatch hopper. The introduction of these components, together with traditional cement stacking methods and dispatch systems, provides for a highly efficient manner of storing and reclaiming material from a horizontal storage facility.

14 Claims, 8 Drawing Sheets

(56) References Cited

U.S. PATENT DOCUMENTS

| | | | | |
|---|---|---|---|---|
| 846,791 A * | 3/1907 | Kennedy et al. | B65G 63/008 | 414/268 |
| 884,559 A * | 4/1908 | Blaisdell | B65G 1/06 | 414/267 |
| 892,593 A * | 7/1908 | Keller | B65G 65/38 | 414/313 |
| 921,021 A * | 5/1909 | Stehling | B65G 65/44 | 414/325 |
| 1,584,442 A * | 5/1926 | Every | B65G 69/00 | 414/142.2 |
| 2,685,375 A * | 8/1954 | Huntzinger | B65G 65/00 | 414/305 |
| 2,827,180 A * | 3/1958 | Bartenfeld | B63B 27/22 | 414/142.6 |
| 3,565,288 A * | 2/1971 | Shute | B65G 47/00 | 222/55 |
| 3,604,757 A * | 9/1971 | White | B65G 65/28 | 406/39 |
| 3,688,924 A * | 9/1972 | Martin, Jr. | B65G 65/06 | 414/313 |
| 3,767,030 A * | 10/1973 | Briggs | B65G 65/20 | 198/518 |
| 3,830,383 A * | 8/1974 | Skippon | B65G 65/38 | 414/323 |
| 4,146,144 A * | 3/1979 | Johansson | B65G 65/36 | 212/307 |
| 4,168,937 A * | 9/1979 | Hagen | B65G 65/36 | 187/404 |
| 4,170,433 A * | 10/1979 | Haahjem | B65G 65/38 | 193/34 |
| 4,230,220 A * | 10/1980 | Iino | B65G 15/14 | 198/509 |
| 4,243,352 A * | 1/1981 | Sizelove | B65G 65/38 | 406/114 |
| 4,286,909 A * | 9/1981 | Tingskog | B65G 67/606 | 198/511 |
| 4,474,523 A * | 10/1984 | Ihle | B63B 27/22 | 414/142.5 |
| 4,616,969 A * | 10/1986 | Haahjem | B65G 65/20 | 414/142.4 |
| 4,784,560 A * | 11/1988 | Haahjem | B63B 27/22 | 414/142.5 |
| 5,024,568 A * | 6/1991 | Johnston | B65G 65/20 | 198/509 |
| 5,785,483 A * | 7/1998 | Smyre | B65G 65/38 | 414/300 |
| 10,781,063 B2 * | 9/2020 | Sucre | B65G 65/28 | |
| 2018/0251324 A1 * | 9/2018 | Sucre | B65G 69/06 | |

FOREIGN PATENT DOCUMENTS

| | | | | |
|---|---|---|---|---|
| JP | 57098404 A * | 6/1982 | | B65D 65/16 |
| JP | 57137233 A * | 8/1982 | | B65G 67/606 |
| JP | 59074828 A * | 4/1984 | | B65G 65/365 |

* cited by examiner

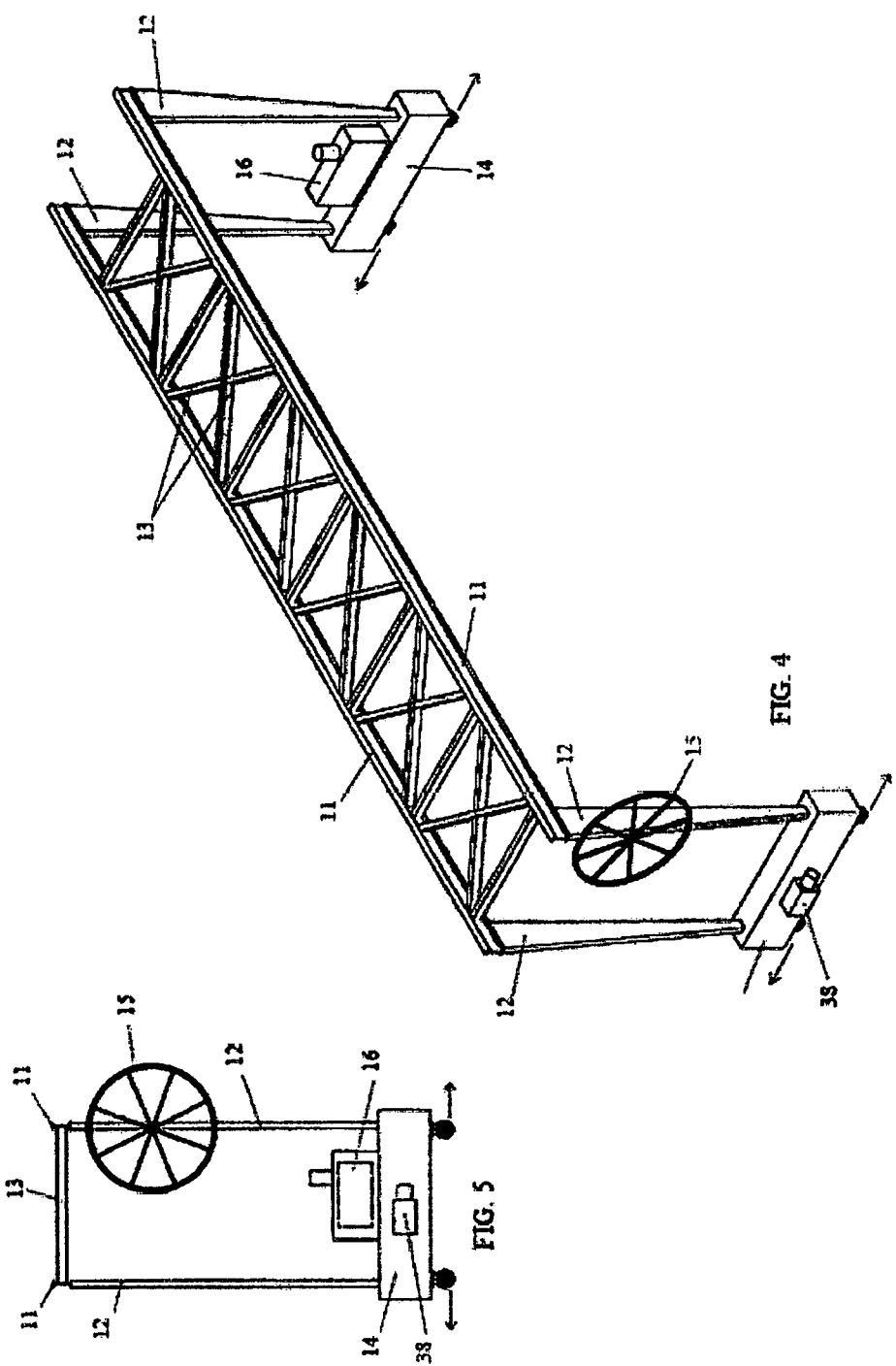

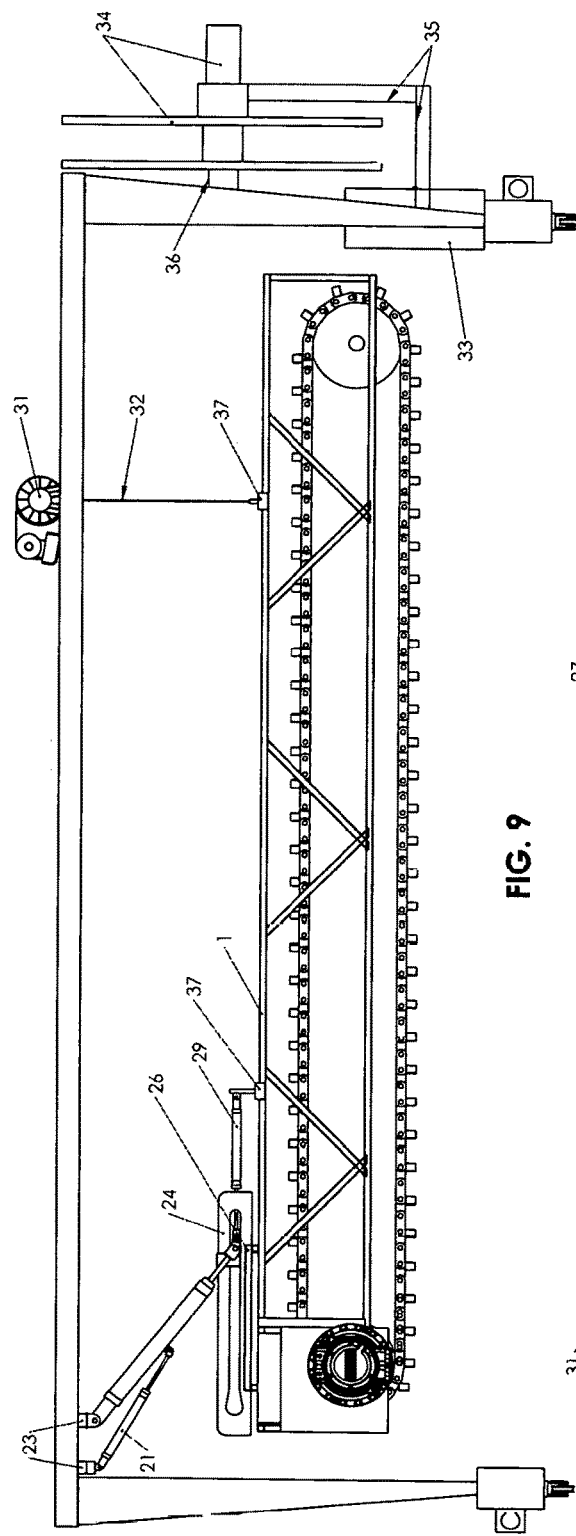
FIG. 9
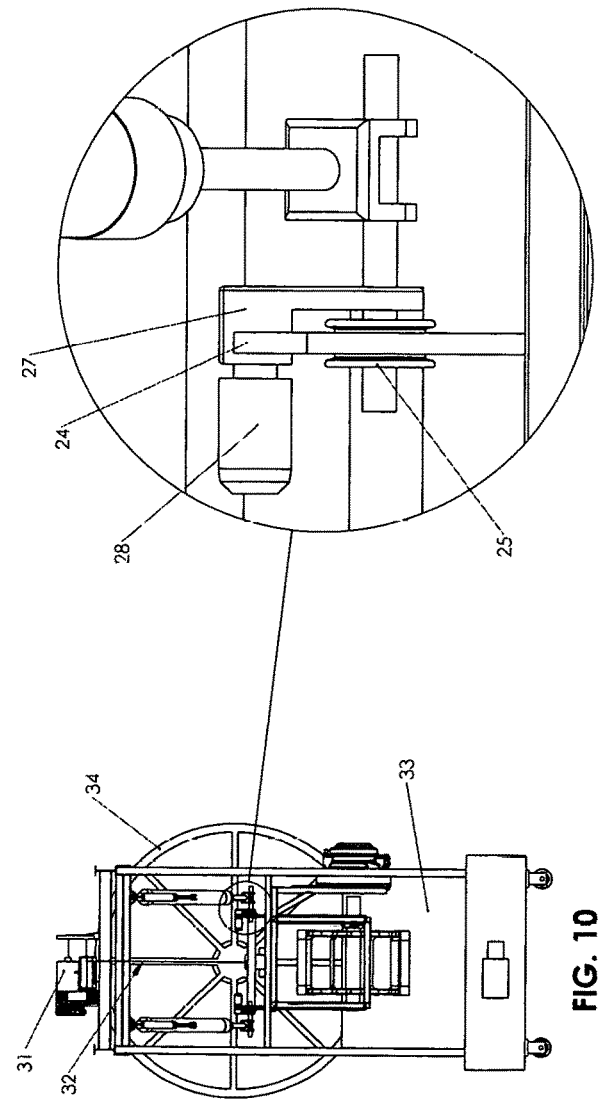
FIG. 10
FIG. 11

U RECLAIMER UTILITY DEVICE APPARATUS

CROSS-REFERENCE TO RELATED APPLICATIONS

Incorporated by reference is provisional patent application U.S. 62/605,060 filed Jul. 31, 2017 which describes a U Reclaimer Utility Device Apparatus of the present invention in a Fully Automated Cement Horizontal Storage System and Method, a U Reclaimer Utility Device Apparatus as a means of movement of cement or related material to a collection means for loading into material transporting vehicles.

STATEMENT REGARDING FEDERALLY SPONSORED RESEARCH OR DEVELOPMENT

"Not Applicable"

THE NAMES OF THE PARTIES TO A JOINT RESEARCH AGREEMENT

"Not Applicable"

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

"Not Applicable"

STATEMENT REGARDING PRIOR DISCLOSURES BY THE INVENTOR OR A JOINT INVENTOR

Incorporated by reference is provisional patent application U.S. 62/605,060 filed Jul. 31, 2017 which describes a U Reclaimer Utility Device Apparatus of the present invention in a Fully Automated Cement Horizontal Storage System and Method, a U Reclaimer Utility Device Apparatus as a means of movement of cement or related material to a collection means for loading into material transporting vehicles.

BACKGROUND OF THE INVENTION

(1) Field of the Invention

The field of this invention relates to bulk material handling systems and more particularly to a utility device and apparatus for movement of bulk material to a collection means.

(2) Description of Related Art Including Information Disclosed Under 37 CFR 1.97

After being manufactured, cement was stored in large, low level shelters either loose or in bags. The cement, if stored loose was removed by means of mechanical shovels to move the cement to a ship or car for transportation. If stored in bags, these bags were stacked and carried off to a ship or railroad car for transportation. However, this mode of operation proved inefficient and costly since much of the cement was damaged by environmental conditions such as moisture or spoilage by contamination. As a result, bulk handling technology was developed, using cast concrete cylinders, generally called "silos" to hold the loose cement. These silos were tall and narrow so that the height of the stored cement would provide gravity force for getting the cement out of the bottom of the silo by mechanical means. With the development of pneumatic conveyors, improved bulk handling techniques resulted. The cement could now be efficiently transferred from silos either through pneumatic conveying system, a pneumatic ship unloader, a mechanical conveying system, a self unloader vessel or bunkers. The silos were the storage containers.

Transport by bulk is now becoming increasingly the primary mode of cement distribution. Cement at the plant is generally stored in silos from where the cement leaves the plant either in bags or in bulk. Bagged movement will require bagging machines, truck loading conveyors, etc. while bulk movement is generally done through enclosed bulk tankers which are pressure vessels. Currently cement companies are moving cement in bulk through such bulk tankers but the costs are not working out to be economical considering the low unit volumes due to poor road conditions and empty returns.

Bulk transport of cement is generally carried out by means of covered hopper railroad cars at plants which have the availability of a railroad siding. At locations generally removed from railroad lines, pneumatic truck trailers are used. The pneumatic conveyors bring and remove the cement to these conveying vehicles. Pneumatic conveyors have played an important role in the development of marine distribution of cement. Many bulk handling ships are mechanically configured to be self-unloading for the most part. The cement is stored in the floors of the holds of the ship and the cement is extracted and transferred to a dockside storage facility which is then used to distribute the cement.

Bulk handling technology for cement has provided both time and cost savings. Other advantages of bulk storage and handling of cement include avoidance of broken bags of cement, necessity to provide dry storage areas, and using bulk distribution of cement to batch manufacturing sites.

Despite the development of bulk handling technology, as well as pneumatic conveyor systems, the installation of a cement storage and distribution center has been costly and required a great amount of time to construct distribution centers. A basic reason for this cost is the storage of cement in silos. Silo construction generally takes years to construct and is very expensive. A typical cylindrical silo is about 10 meters in diameter and can be as high as 50 meters. Cement is fed into the storage silos and contained there until distribution is needed. Because of the poor flow characteristics of cement, silos are typically very tall and narrow so that a flow of cement can be obtained by gravitational force on the column of cement which pushes it downward. Cement can then be removed at the bottom of the silo by means of a screw mechanism or a solid fuel pump. Powdered cement when stacked to great heights in the silo tends to transfer its weight to the walls of the silo as well as the base of the silo. Because of the great height, it is necessary to construct the silo walls to be very thick and strong throughout the full height of the silo. This causes silo construction to be expensive and of long duration.

The origin of the flat storage system is based on the availability of old and unused warehouses at many putts and harbors. Such warehouses are converted into waterproof and airtight enclosures and the cement is pumped in from the ship either through pneumatic conveying systems, a pneumatic ship unloader, a mechanical conveying system, a self-unloader vessel or bunkers. The flat storage is an option to building large and expensive cylindrical silos which also take time to build. The advantages of horizontal flat storage are accomplished with a material movement device as presented in the present invention, a U Reclaimer Utility Device Apparatus.

It is accordingly an objective of the present invention to avoid the problems of prior art material movement ti devices. A further object of the present invention is to provide a U Reclaimer Utility Device Apparatus for material movement to a material collection means for transport by material handling vehicles.

It is yet a further object of the present invention to provide an innovative U Reclaimer Utility Device Apparatus that has horizontal and elevated movement across a material holding means to move material to a collection means for further transport of material by material handling vehicles.

It is still a further object of the present invention to provide an innovative U Reclaimer Utility Device Apparatus that has vertical movement across a material holding means placing a U Reclaimer Utility Device Apparatus at the top of a pile of material and moving the U Reclaimer Utility Device Apparatus lower as the pile of material is depleted and move material to a collection means for further transport of material by material handling vehicles.

These and further objects, features and advantages of the present invention will become obvious from a detailed description of the invention, taken in conjunction with the accompanying drawings, which form an integral part thereof.

SUMMARY OF THE INVENTION

This invention relates to cement or other bulk material handling systems and more particularly to a bulk material movement device apparatus, a U Reclaimer Utility Device Apparatus.

The use of flat storages or warehouses to store cement and other bulk material has been a practice performed by several countries around the world. Even though it is relatively easy to store cement inside a horizontal warehouse using a pneumatic conveying system, the reclaiming of the product has been very problematic, inefficient and costly. Normally the cement is reclaimed from a horizontal warehouse using a fully aerated floor, or introducing a front loader with an operator inside the warehouse, who pushes the material towards an aerated pit. The first reclaiming system mentioned above is expensive and consumed large amount of energy, while the second method is extremely dangerous and, in some countries, this form of operation, using a front loader inside a cement warehouse, has been completely banned by the safety authorities.

The origin of the flat storage system is based on the availability of old and unused warehouses at many ports and harbors. Such warehouses are converted into waterproof and airtight enclosures and the cement is pumped in from the ship either through pneumatic ship unloaders, self-unloading ships or bunkers. The flat storage is an option to building large and expensive cylindrical silos which also take time to build.

The present invention is a new reclaiming device apparatus to efficiently reclaim cement from a horizontal warehouse. This new reclaiming utility device apparatus, a U Reclaimer Utility Device Apparatus, combined with open and enclosed air slides provides an efficient method of reclaiming stored bulk cement or cementious materials.

Air slide conveyors use the force of gravity to do most of the work without any moving parts. Material is fluidized through a porous media with low pressure air. Material flow is achieved by sloping the Air slide conveyor to match the fluidized angle of repose of the powdered material. At the correct slope, fluidized materials flow with the consistency of a liquid.

Energy requirements of an air system to move bulk material are minimal because only a small volume of air at a low pressure is required to move material. These air systems are installed underground, thereby conserving floor space.

Further, the present invention introduces a conveying system, composed by a cascade of enclosed air slides and elevator machines, to convey the cement from a reclaiming area to a dispatch area, either to a hopper or directly to trucks. The introduction of these components, together with the traditional cement stacking methods and dispatch systems, has allowed development of an efficient storage and reclaiming machine, the U Reclaimer Utility Device Apparatus of the present invention.

BRIEF DESCRIPTION OF THE DRAWINGS

FIG. 4 is an isometric drawing of a gantry frame structure of the U Reclaimer Utility Device Apparatus of the present invention. A gantry of the U Reclaimer Utility Device Apparatus 45 of FIG. 1 comprises a frame structure whose upper part includes two parallel Upper Girders 11 at opposite ends with diagonal and transverse Vertical Girders 12 for support. Steel Beams 13 attach to Upper Girders 11 to complete an upper gantry frame structure of the U Reclaimer Utility Device Apparatus 45 of FIG. 1. Supporting both parallel Upper Girders 11 are four total Vertical Girders 12 which are provided with pre-manufactured Motorized End Carriages 14, as shown two in total. A Geared Motor 17 is provided with the pre-manufactured Motorized End Carriages 14 provides motive power for the U Reclaimer Utility Device Apparatus 45 gantry's movement. A Cable Reel 15 is also shown in FIG. 4. A Hydraulic Power Unit 16 is shown mounted on a Motorized End Carriage 14.

FIG. 5 is a front view drawing of the gantry frame structure of the U Reclaimer Utility Device Apparatus of the present invention. Motorized End Carriage 14 comprises two Carriage Wheels 18 for directional motion of a gantry frame structure of the U Reclaimer Utility Device Apparatus 45 of FIG. 1. Also shown in FIG. 5 is a Motorized End Carriage 14 with Geared Motor 17. Vertical Girders 12 support Upper Girders 13 attached with Steel Beams 13. Cable Reel 15 is mounted on an Upper Girder 11.

Figure 1:
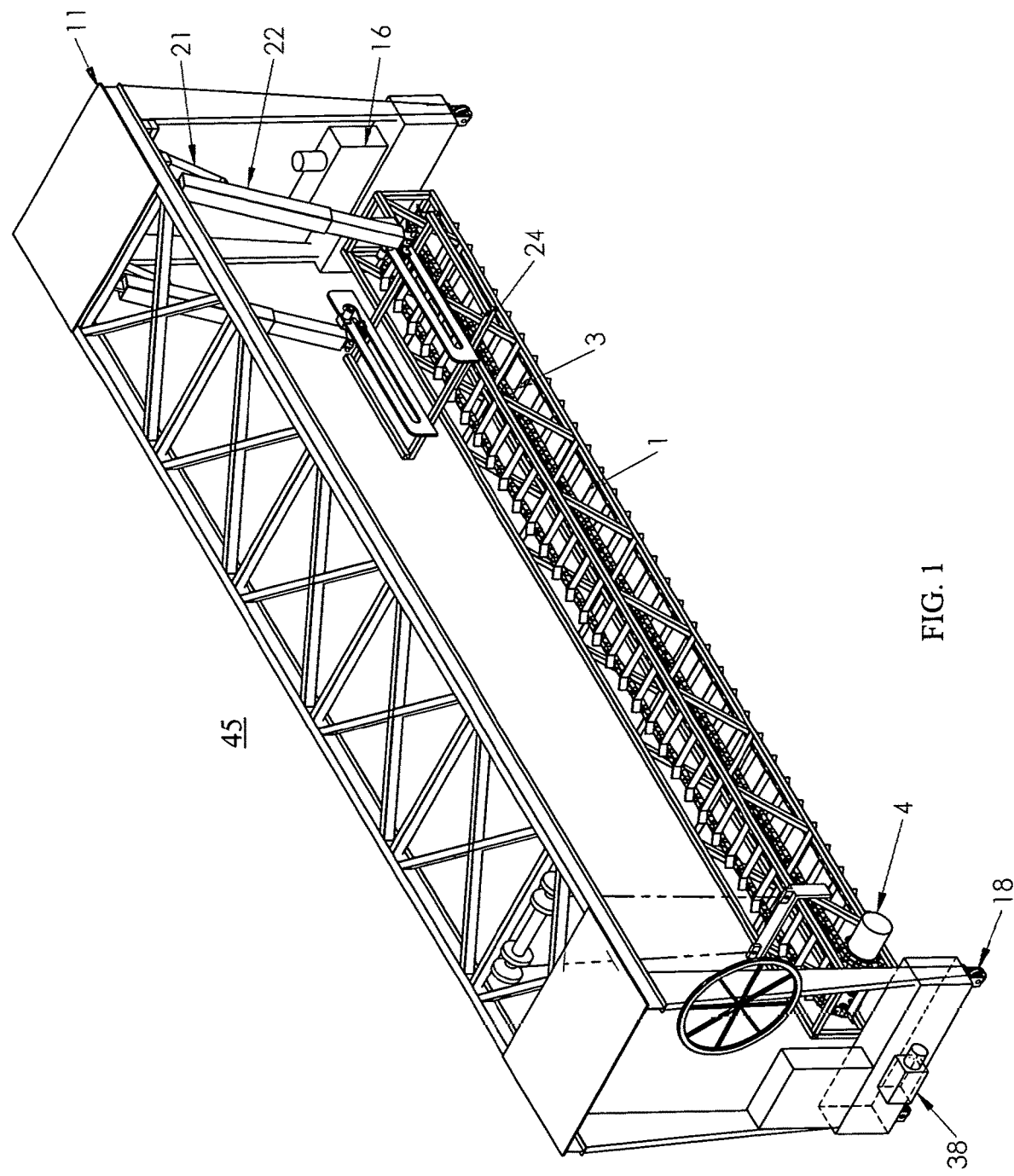
FIG. 1 is an isometric drawing showing main components of U Reclaimer Utility Device Apparatus 45 of the present invention showing Upper Girders 11, Elevation Hydraulic Cylinders 21, Main Hydraulic Cylinders 22, Hydraulic Power Unit 16, Slotted Guide 24, Reclaimer Main Structure 1, Reclaimer Chain 3, Hydraulic Direct Drive Motor 4, Carriage Wheels 18 and Motor 38. Other components of U Reclaimer Utility Device Apparatus 45 will be shown in further figures, FIG. 2 through FIG. 13.
Figure 6:
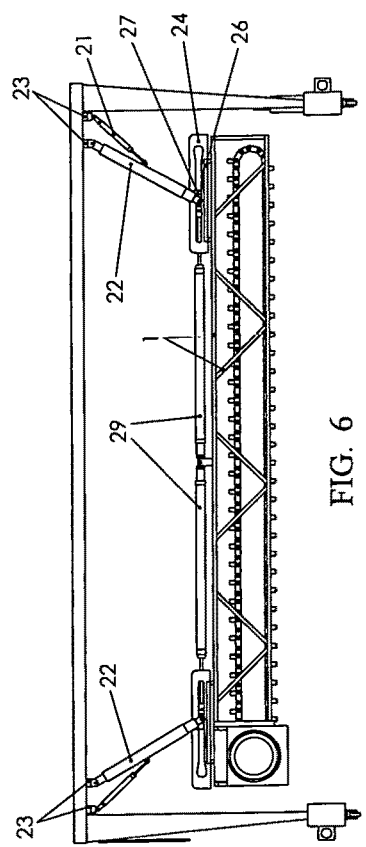

FIG. 6 is a side view drawing of U Reclaimer Utility Device Apparatus 45 showing a side view of the isometric drawing of FIG. 1. A Gantry Frame Structure with a Support Suspension Assembly shown in FIG. comprises four Main Hydraulic Cylinders 22 for movement, four Elevation Hydraulic Cylinders 21 on both sides of Gantry Frame Structure with a Suspension Assembly and two Hydraulic Pistons 29 parallel to Reclaimer Main Structure 1. The Gantry Frame Structure with a Suspension Assembly can be lowered on both ends, vertically or diagonally to accomplish movement of material by the U Reclaimer Utility Device Apparatus 45, as previously disclosed in FIG. 1 and FIG. 2. Elevation Hydraulic Cylinders 21 control angular movement of Gantry Frame Structure with a Suspension Assembly. Main Hydraulic Cylinders 22 and Hydraulic Pistons 29 control axial movement of Gantry Frame Structure with a Suspension Assembly. The bottom connecting part of Main Hydraulic Cylinders 22 are attached to a Mechanical Brake System 27 shown in more detail in FIG. 7. Mechanical Brake System 27 is mounted on a Slotted Guide 24 inside of which is a V-Groove Wheel 25 which travels on an axial slot that allows movement of U Reclaimer Utility Device Apparatus 45.

Figure 7:
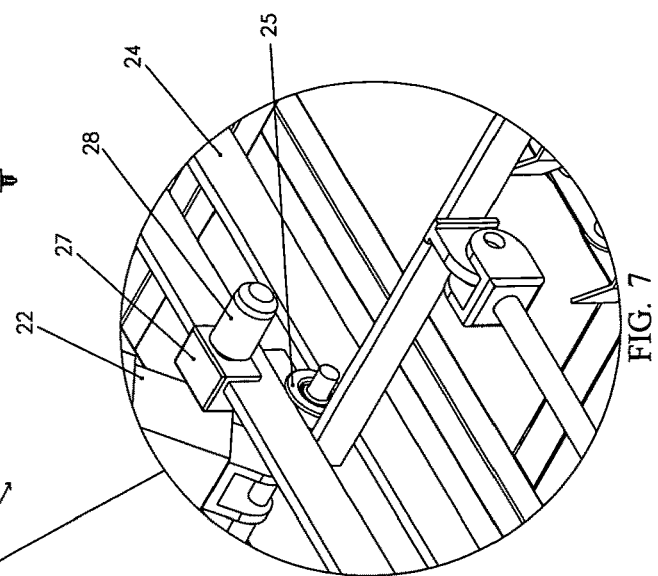

FIG. 7 is a detailed isometric drawing of a Slotted Guide 24 showing a Mechanical Brake System 27 which is activated by Brake Hydraulic Piston 28 to stop axial movement of Main Hydraulic Cylinder 22 which is connected to V-Groove Wheel 25 which travels on an axial slot that allows movement of the U Reclaimer Utility Device Apparatus.

Figure 8:
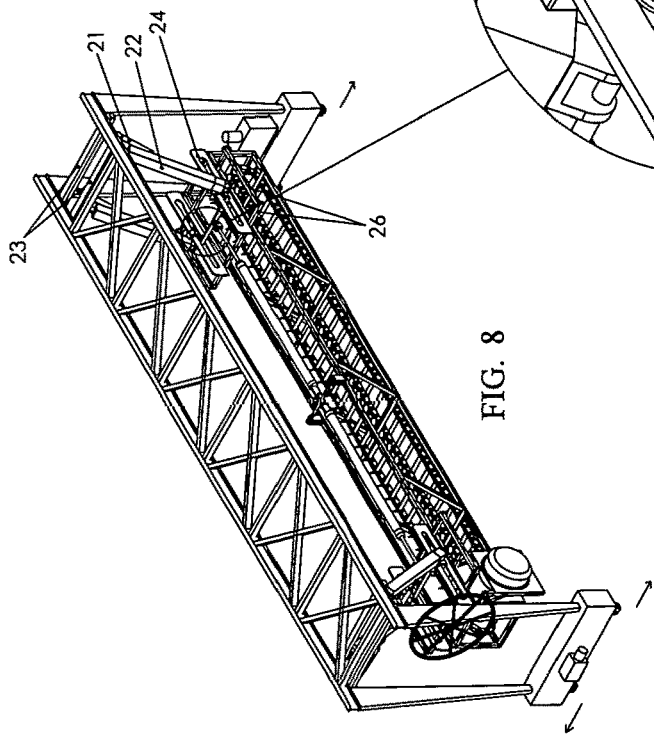

FIG. 8 is an isometric drawing of Gantry Frame Structure with a Suspension Assembly showing Hydraulic Cylinders Support 23, Main Hydraulic Cylinders 22, Elevation Hydraulic Cylinders 21, Slotted Guide 24, and High Strength Steel Frame 26.

FIG. 9 is a side view drawing of U Reclaimer Utility Device Apparatus 45, which is a preferred embodiment of a U Reclaimer Utility Device Apparatus of the present invention, more clearly showing Gantry Frame Structure with a Suspension Assembly comprising two main components. One side being controlled by Main Hydraulic Cylinders 22 and Elevation Hydraulic Cylinders 21 and the other side being controlled by a Winch 31 suspended from a Steel Wire Cable 32. The suspension system can be lowered on both ends, vertically and diagonally. On one side, Elevation Hydraulic Cylinders 21 control angular movement while Main Hydraulic Cylinders 22 and Hydraulic Pistons 29 control axial movement. On the opposite side, Winch controls the lowering and rising movement providing different angles for the reclaimer. In order to prevent any transversal movement of U Reclaimer Utility Device Apparatus 45, a Hydraulic Piston 29 is mounted to the main body of Mechanical Brake System 27 on the Main Hydraulic Cylinders 22 side. This Hydraulic Piston will stop any transversal movement and auto corrects its position, with sensors involved, when Reclaimer Main Structure 1 is inclined. The bottom part of the Main Hydraulic Cylinder 22 is attached to a Mechanical Brake System 27 which will provide the clamping force to a Slotted Guide 24 to stop the U Reclaimer Utility Device Apparatus on the Main Hydraulic Cylinders 22 side. On one side of the Gantry Frame Structure with a Suspension Assembly, a pre-manufactured Motor Driven Cable Reel 34 is mounted on a Shaft 36 which is mounted on a Cable Reel Support Structure 25. This shaft will reel an electrical cable needed to power the system.

FIG. 10 is a front view of U Reclaimer Utility Device Apparatus 45 showing Winch 31, Motor Driven Cable Reel 34, Programmable Logic Controller at Panel 33, and Steel Wire Cable 32. This drawing shows the preferred embodiment of the present invention, a U Reclaimer Utility Device Apparatus 45.

FIG. 11 is a detailed drawing showing Main Hydraulic cylinder 22, Mechanical Brake System 27, Slotted Guide 24, Hydraulic Brake Piston 28 and V-Groove Wheel 25.

Figure 12:
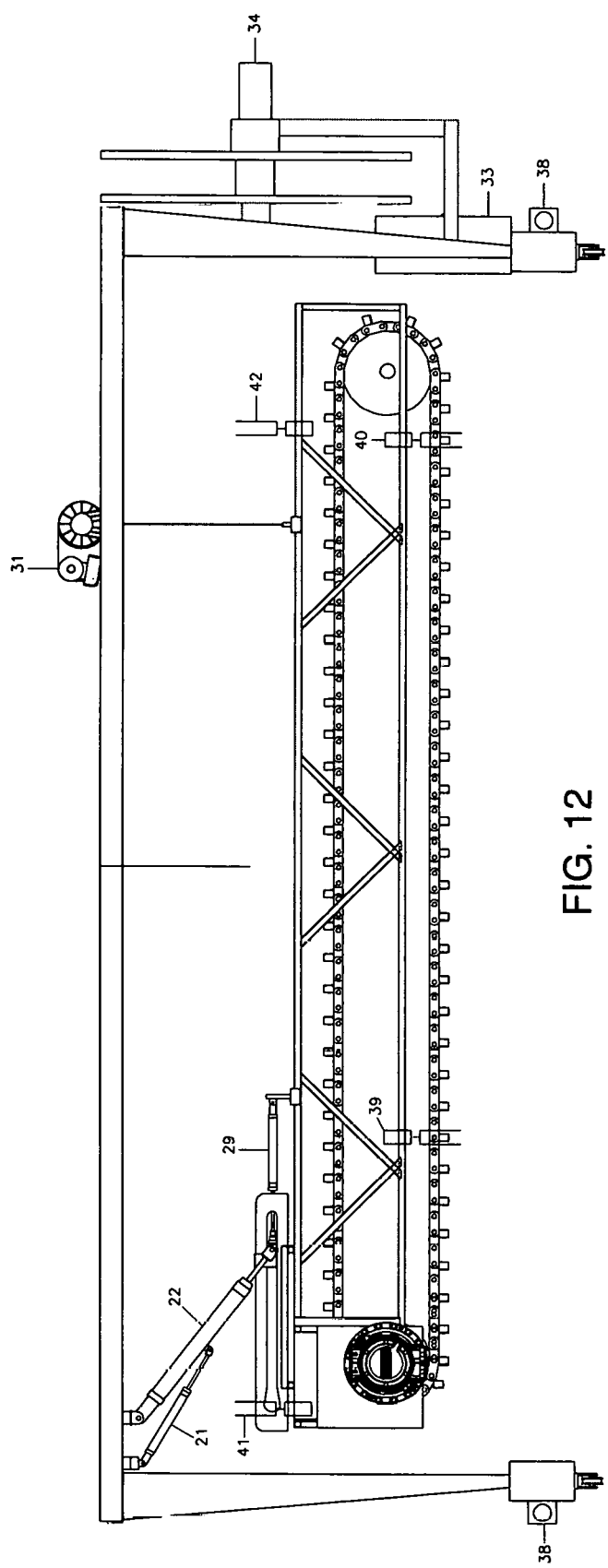

FIG. 12 is a side view drawing of U Reclaimer Utility Device Apparatus 45 showing Winch 31, Motor Driven Cable Reel 34, Motors with Encoders 38, Programmable Logic Controller at Panel 33, Elevation Hydraulic Cylinder 21, Main Hydraulic Cylinder 22, and Hydraulic Piston 29. Also shown are Electronic Level Switches with Vibratory Forks 39,40,41, and 42.

Figure 13:
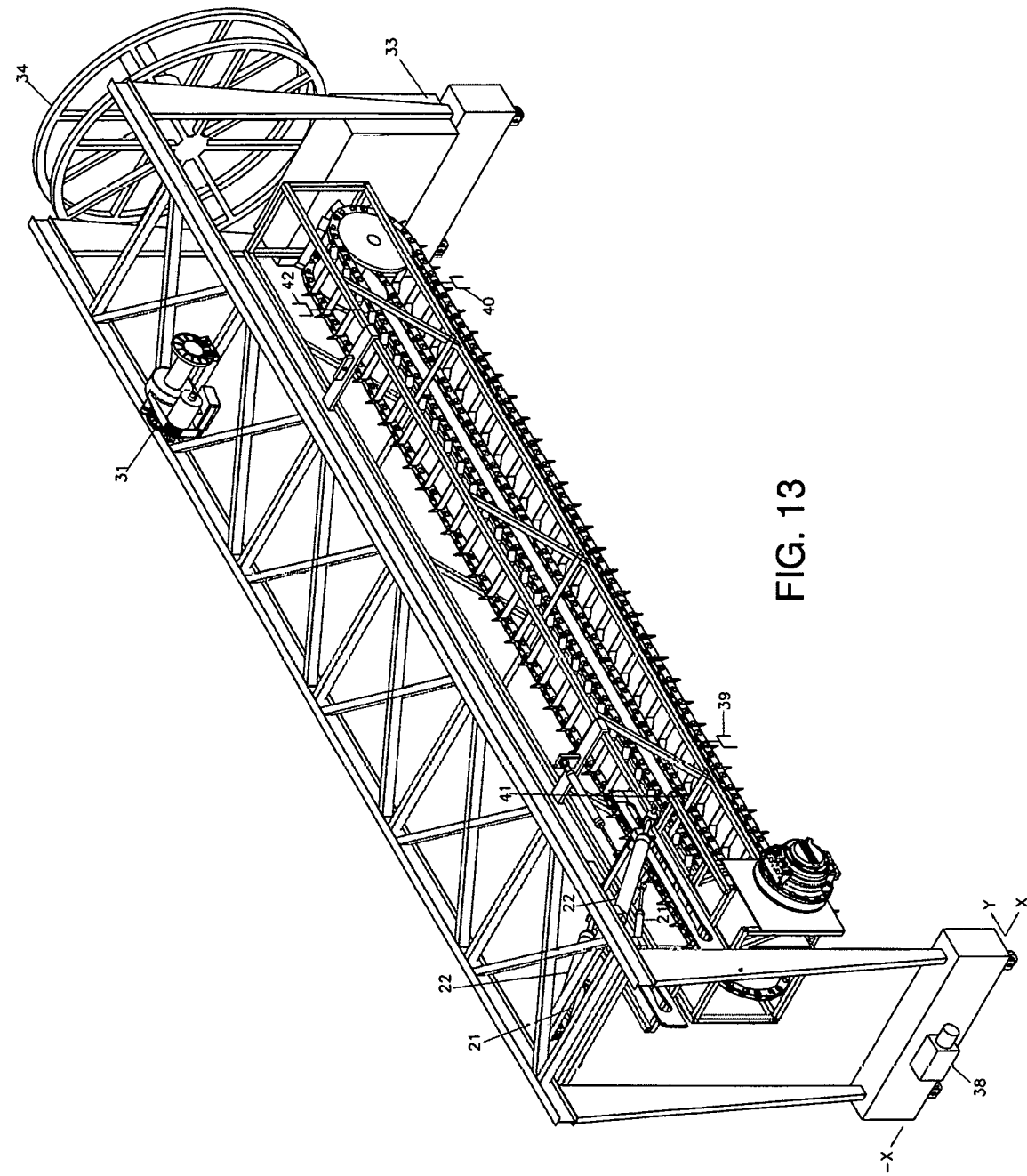
Figure 14:
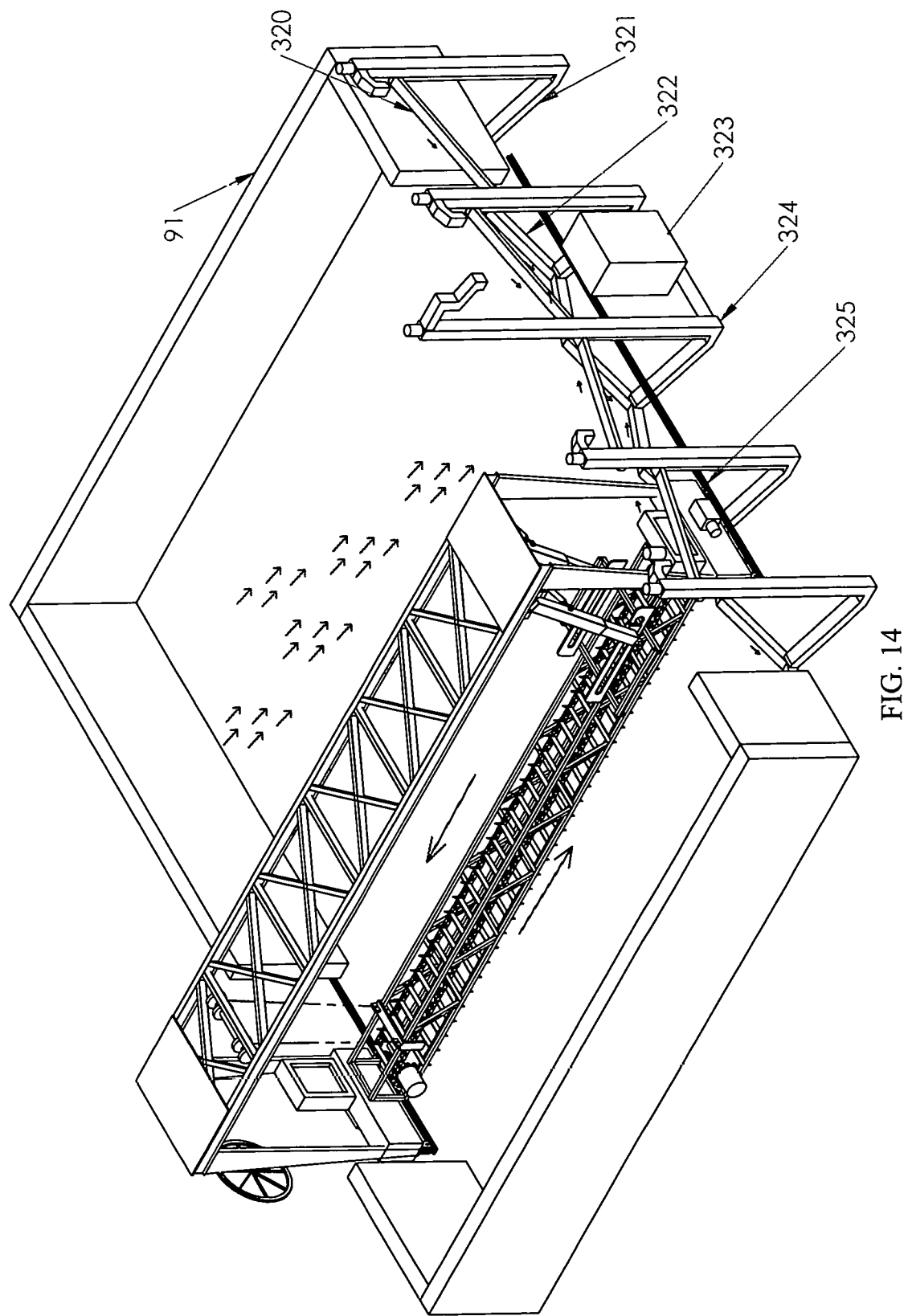

FIG. 13 is an isometric drawing showing U Reclaimer Utility Device Apparatus 45 to include electronic control components. Motors with Encoders 38 mounted on U Reclaimer Utility Device Apparatus 45 are provided with encoders that send a signal to a Programmable Logic Controller at Panel 33. At the same time, the Programmable Logic Controller is receiving the position of Motors with Encoders 38 at front and end of U Reclaimer Utility Device Apparatus 45 and activate a Cable Reel 34 in order to coil or un-coil a power cable that feeds Cable Reel 34. The logic programmed in the Programmable Logic Controller at Panel 33 will send signals to Cable Reel 34 rotation direction and speed depending on the position and speed of the Gantry Frame Structure Frame powered by Motors with Encoders 38. As shown in FIG. 14, an X-axis is noted for movement of U Reclaimer Utility Device Apparatus 45 through power provided by Motors with Encoders 38.

FIG. 14 is an isometric drawing of a Fully Automated Cement Horizontal Storage System of the present invention showing enclosed air slide 320, enclosed air slide 321, open air slide 322, dust collector 323, screw conveyor 324, and rail 325 to allow movement of U Reclaimer Utility Device Apparatus 45 along horizontal storage housing 91 to reclaim cement stored within.

DETAILED DESCRIPTION OF THE INVENTION

Incorporated by reference and claiming benefit of provisional patent application U.S. 62/605,060 filed Jul. 31, 2017 which describes a U Reclaimer Utility Device Apparatus of the present invention in a Fully Automated Cement Horizontal Storage System and Method, a U Reclaimer Utility Device Apparatus as a means of movement of cement or related material to a collection means for loading into material transporting vehicles.

This invention relates to cement handling systems or similar materials handling systems and more particularly to a bulk cement storage system reclaiming device of the present invention, a U Reclaimer Utility Device Apparatus, for reclaiming of product from a cement horizontal storage facility or similar material horizontal storage facility. Reclaiming of cement once stored in horizontal storage is performed through use of a mechanical cement reclaiming machine, a U Reclaimer Utility Device Apparatus, of the present invention. Cascade air slides are used to remove stored material recovered by a U Reclaimer Utility Device Apparatus as described further. Turning now to drawings which further describe the present invention:

FIG. 1 is an isometric drawing showing main components of U Reclaimer Utility Device Apparatus 45 of the present invention showing Upper Girders 11, Elevation Hydraulic Cylinders 21, Main Hydraulic Cylinders 22, Hydraulic Power Unit 16, Slotted Guide 24, Reclaimer Main Structure 1, Reclaimer Chain 3, Hydraulic Direct Drive Motor 4, Carriage Wheels 18 and Motor 38. Other components of U Reclaimer Utility Device Apparatus 45 will be shown in further figures, FIG. 2 through FIG. 13.

U Reclaimer Utility Device Apparatus 45 travels along a horizontal storage by means of either rails or rubber tires, named Carriage Wheels 18. Two Motors with Encoders 38, one in front and one at the end of U Reclaimer Utility Device Apparatus 456, both Motors with Encoders 38 rotate at the same speed to move U Reclaimer Utility Device Apparatus 45 along a horizontal storage of bulk material. The speed of U Reclaimer Utility Device Apparatus 45 is controlled as described further. A vibrating sensor attached on a Reclaimer Main Structure indicates if U Reclaimer Utility Device Apparatus 45 is traveling too fast or if the Reclaimer Main Structure is too deep inside the storage material, reducing the speed of U Reclaimer Utility Device Apparatus 45, and adjusts height of Reclaimer Main Structure 1. Main components of U Reclaimer Utility Device Apparatus 45 are the following:

a) U Reclaimer Utility Device Apparatus 45 Carriage Wheels 18

U Reclaimer Utility Device Apparatus 45 travels along a horizontal storage facility by means of steel flanged Carriage Wheels 18 arranged outside of longitudinal walls of a horizontal storage facility on rails, or rubber Carriage Wheel 18 tires.

b) Hydraulic Power Unit 16

A Hydraulic Power Unit 16 is installed at end of U Reclaimer Utility Device Apparatus 45 as shown in FIG. 1. All movable components that are in direct contact with storage material, such as the Reclaimer Main Structure 1 and a Reclaimer Chain 3 will be driven by means of hydraulic fluid pressure. However, these components may also be driven using electrical motors.

c) U Reclaimer Utility Device Apparatus 45 Hydraulic Cylinders 21 and 22

A Reclaimer Main Structure 1 is lowered and lifted by means of Elevation Hydraulic Cylinders 21 and Main Hydraulic Cylinders 22. The Reclaimer Main Structure 1 may work inclined towards an open aeroslide to facilitate a product reclaiming operation.

d) Reclaimer Chain 3

A Reclaimer Chain 3 is operated by means of a Hydraulic Direct Drive Motor 4 to push stored material towards an open aeroslide of a horizontal storage facility. Reclaimer Chain 3 has blades attached to allow pushing of stored material. Reclaimer Chain 3 runs on channels and has two sprockets on each side of Reclaimer Main Structure 1. Four or two hydraulic cylinders, according to density of material being reclaimed, are attached to the side of Reclaimer Main Structure 1 and to top of U Reclaimer Utility Device Apparatus 45 to avoid transversal and longitudinal movement of Reclaimer Main Structure 1 when material is being pushed or when U Reclaimer Utility Device Apparatus 45 touches the side of a stored material pile.

e) Limit Switches and Control

U Reclaimer Utility Device Apparatus 45 is fully automated. However, the initial positioning of U Reclaimer Utility Device Apparatus 45 must be performed by an operator using a remote control. Once the machine has been positioned at the beginning of a stored material pile, then U Reclaimer Utility Device Apparatus 45 can work completely in automatic mode.

Either encoders or several limit switches have been arranged along a horizontal storage facility to indicate the position of U Reclaimer Utility Device Apparatus 45 on a horizontal storage stockyard. Depending of the position of U Reclaimer Utility Device Apparatus 45, a specific sector of a horizontal storage facility will be activated to initiate the aeration of a sector and the reclaiming of product.

U Reclaimer Utility Device Apparatus 45 has winches and cylinders that have limit switches to indicate the position and inclination of Reclaimer Main Structure 1. A vibrating sensor wire assembled around Reclaimer Main Structure 1 indicates if U Reclaimer Utility Device Apparatus 45 is traveling too fast or if the reclaiming blades mounted on Reclaimer Chain 3 are too deep inside the product.

Figures 2, 3:
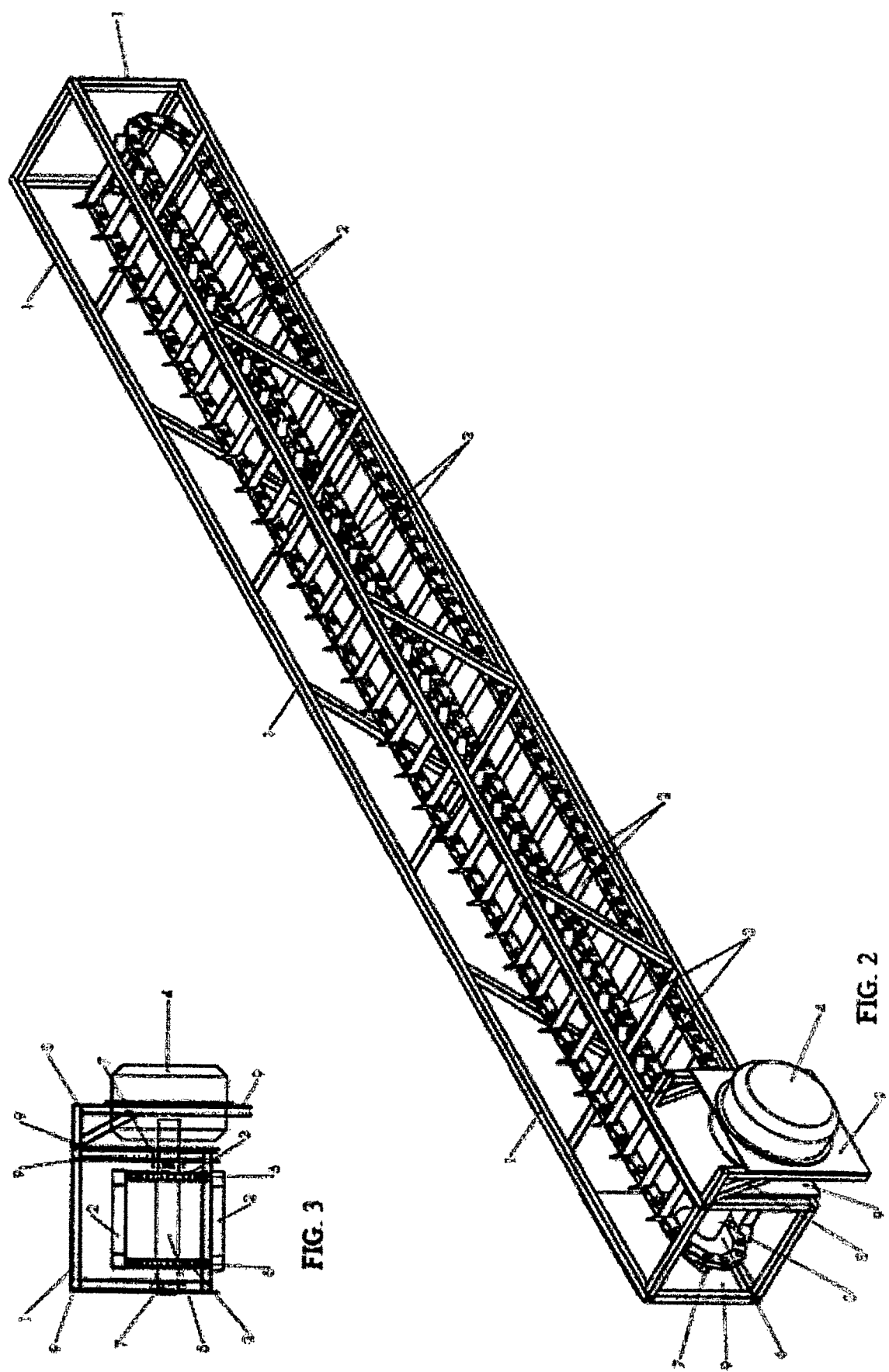
FIG. 2 is an isometric drawing of a Reclaimer Main Structure 1 which supports Reclaimer Chain 3 mounted with Scrapers 2. A Motor Structure 8 and Metal Plate 9 support a Hydraulic Direct Drive Motor 4 which couples to Sprocket 6 mounted on Motor Shaft 5. A Pillow Block Bearing 7 is shown mounted on Motor Shaft 5.
FIG. 3 is a front plan view drawing of a Reclaimer Main Structure 1 supporting a Hydraulic Direct Drive Motor 4 mounted on Motor Structure 8 and Metal Plate 9. A plurality of Pillow Block Bearings 7 are shown mounted on Motor Shaft 5. A front view of Reclaimer Chain 3 is shown with Scrapers 2 mounted on Reclaimer Chain 3.

FIG. 2 is an isometric drawing of a Reclaimer Main Structure 1 which supports Reclaimer Chain 3 mounted with Scrapers 2. A Motor Structure 8 and Metal Plate 9 support a Hydraulic Direct Drive Motor 4 it which couples to Sprocket 6 mounted on Motor Shaft 5. A Pillow Block Bearing 7 is shown mounted on Motor Shaft 5.

The purpose of a Reclaimer Main Structure 1 as shown in FIG. 2, a part of a U Reclaimer Utility Device Apparatus 45 of FIG. 1, is to hold in place all the components that will do the job of moving material by means of scraping material which is piled on the floor from a starting point to a collecting point through motive action of a Reclaimer Chain 3 fitted with Scrapers 2 of FIG. 2. All the components of this assembly are supported and protected by Reclaimer Main Structure 1. Once Hydraulic Direct Drive Motor 4 is turned on, this motor begins radial motion applying torque onto Motor Shaft 5 to provide torque to drive Sprocket 6 connected to Reclaimer Chain 3, thereby providing motion to Reclaimer Chain 3 which supports Scrapers 2 to move material.

FIG. 3 is a front plan view drawing of a Reclaimer Main Structure 1 supporting a Hydraulic Direct Drive Motor 4 mounted on Motor Structure 8 and Metal Plate 9. A plurality of Pillow Block Bearings 7 are shown mounted on Motor Shaft 5. A front view of Reclaimer Chain 3 is shown with Scrapers 2 mounted on Reclaimer Chain 3.

FIG. 2 and FIG. 3 shows a Reclaimer Main Structure 1 which is constructed from either rectangular high strength steel tubing, or steel angles cut to length and welded. Other high strength materials can also provide a Reclaimer Main Structure 1 to support and house the shown components. An additional Motor Structure 8 is welded onto Reclaimer Main Structure 1, also made from high strength steel or similar high strength material. Metal Plate 9 is welded onto Reclaimer Main Structure 1. Both Motor Structure 8 and Metal Plate 9 house and support Hydraulic Direct Drive Motor 4. A Motor Shaft 5 is connected to Hydraulic Direct Drive Motor 4. A plurality of Pillow Block Bearings 7 provide support to Motor Shaft 5 and allow for circular motion of Motor Shaft 5 when in operation by Hydraulic Direct Drive Motor 4 providing torque to Motor Shaft 5. A Reclaimer Chain 3 is pre-fabricated of high strength steel or similar material and mounted on Sprocket 6 which is mounted on Motor Shaft 5 providing support and connecting to Reclaimer Chain 3 to provide torque to Reclaimer Chain 3 when in operation by Hydraulic Direct Drive Motor 4. Scrapers 2 are pre-fabricated onto Reclaimer Chain 3 to provide scraping means to move material when in operation.

FIG. 4 is an isometric drawing of a gantry frame structure of the U Reclaimer Utility Device Apparatus of the present invention. A gantry frame structure of the U Reclaimer Utility Device Apparatus 45 of FIG. 1 comprises a frame structure whose upper part includes two parallel Upper Girders 11 at opposite ends with diagonal and transverse Vertical Girders 12 for support. Steel Beams 13 attach to Upper Girders 11 to complete an upper gantry frame structure of the U Reclaimer Utility Device Apparatus 45 of FIG. 1. Supporting both parallel Upper Girders 11 are four total Vertical Girders 12 which are provided with pre-manufactured Motorized End Carriages 14, as shown two in total. A Geared Motor 17 is provided with the pre-manufactured Motorized End Carriages 14 provides motive power for the U Reclaimer Utility Device Apparatus 45 gantry's movement. A Cable Reel 15 is also shown in FIG. 4. A Hydraulic Power Unit 16 is shown mounted on a Motorized End Carriage 14.

FIG. 5 is a front view drawing of the gantry frame structure of the U Reclaimer Utility Device Apparatus of the present invention. Motorized End Carriage 14 comprises two Carriage Wheels 18 for directional motion of a gantry frame structure of the U Reclaimer Utility Device Apparatus 45 of FIG. 1. Also shown in FIG. 5 is a Motorized End Carriage 14 with Geared Motor 17. Vertical Girders 12 support Upper Girders 13 attached with Steel Beams 11. Cable Reef 15 is mounted on an Upper Girder 11.

The main structure of the gantry frame structure of the U Reclaimer Utility Device Apparatus 45 of FIG. 1 is constructed of several rolled steel Upper Girders 11, Vertical Girders 12, Steel Beams 13 bolted and welded into place as shown in FIG. 4 and FIG. 5. An upper part of the gantry frame structure comprises two Vertical Girders 11 bolted or welded into Vertical Girders 12. Four Vertical Girders 12 are bolted or welded into place into the bottom Motorized End Carriages 14.

FIG. 6 is a side view drawing of U Reclaimer Utility Device Apparatus 45 showing a side view of the isometric drawing of FIG. 1. A Gantry Frame Structure with a Suspension Assembly shown in FIG. 6 comprises four Main Hydraulic Cylinders 22 for movement, four Elevation Hydraulic Cylinders 21 on both sides of Gantry Frame Structure with a Suspension Assembly and two Hydraulic Pistons 29 parallel to Reclaimer Main Structure 1. Gantry Frame Structure with a Suspension Assembly can be lowered on both ends, vertically or diagonally to accomplish movement of material by the U Reclaimer Utility Device Apparatus 45, as previously disclosed in FIG. 1 and FIG. 2. Elevation Hydraulic Cylinders 21 control angular movement of Gantry Frame Structure with a Suspension Assembly. Main Hydraulic Cylinders 22 and Hydraulic Pistons 29 control axial movement of Gantry Frame Structure with a Suspension Assembly. The bottom connecting part of Main Hydraulic Cylinders 22 are attached to a Mechanical Brake System 27 shown in more detail in FIG. 7. Mechanical Brake System 27 is mounted on a Slotted Guide 24 inside of which is a V-Groove Wheel 25 which travels on an axial slot that allows movement of U Reclaimer Utility Device Apparatus 45.

FIG. 7 is a detailed isometric drawing of a Slotted Guide 24 showing a Mechanical Brake System 27 which is activated by Brake Hydraulic Piston 28 to stop axial movement of Main Hydraulic Cylinder 22 which is connected to V-Groove Wheel 25 which travels on an axial slot that allows movement of the U Reclaimer Utility Device Apparatus.

FIG. 8 is an isometric drawing of Gantry Frame Structure with a Suspension Assembly showing to Hydraulic Cylinders Support 23, Main Hydraulic Cylinders 22, Elevation Hydraulic Cylinders 21, Slotted if Guide 24, and High Strength Steel Frame 26.

FIG. 9 is a side view drawing of U Reclaimer Utility Device Apparatus 45 which is a preferred embodiment of the present invention, a U Reclaimer Utility Device Apparatus 45, more clearly showing Gantry Frame Structure with a Suspension Assembly comprising two main components. One side being controlled by Main Hydraulic Cylinders 22 and Elevation Hydraulic Cylinders 21 and the other side being controlled by a Winch 31 suspended from a Steel Wire Cable 32. The suspension system can be lowered on both ends, vertically and diagonally. On one side, Elevation Hydraulic Cylinders 21 control angular movement while Main Hydraulic Cylinders 22 and Hydraulic Pistons 29 control axial movement. On the opposite side, Winch 31 controls the lowering and rising movement providing different angles for the reclaimer. In order to prevent any transversal movement of U Reclaimer Utility Device Apparatus 45, a Hydraulic Piston 29 is mounted to the main body of Mechanical Brake System 27 on the Main Hydraulic Cylinders 22 side. This Hydraulic Piston 29 will stop any transversal movement and auto corrects its position, with sensors involved, when Reclaimer Main Structure 1 is inclined. The bottom part of the Main Hydraulic Cylinder 22 is attached to a Mechanical Brake System 27 which will provide the clamping force to a Slotted Guide 24 to stop the U Reclaimer Utility Device Apparatus on the Main Hydraulic Cylinders 22 side. On one side of the Gantry Frame Structure with a Suspension Assembly, a pre-manufactured Motor Driven Cable Reel 34 is mounted on a Shaft which is mounted on a Cable Reel Support Structure 25. This shaft will reel an electrical cable needed to power the system.

Elevation Hydraulic Cylinders 21 and Main Hydraulic Cylinders 22 will be bolted on High Strength Steel Tubing 23 which will be either bulled or welded to Gantry Frame Structure with a Suspension Assembly. All Main Hydraulic Cylinders 22, Elevation Hydraulic Cylinders 21 and Hydraulic Pistons 29 will be pre-manufactured including the Hydraulic Brake Piston 28 for Mechanical Brake System 27 and Slotted Guide 24 will be manufactured from A36 steel. All of these components will be bolted or welded onto High Strength Steel Structure 26 which will be bolted or welded onto the Reclaimer Main Structure 1. A Winch 31 will be mounted on top of the Gantry Frame Structure with a Suspension Assembly frame. A Steel Wire Cable 32 provided with Winch 31 will be attached to Reclaimer Frame Mount 37 thus holding the reclaimer structure on this side. Cable Reel Support Structure 35 will be bolted or welded onto Gantry Frame Structure with a Suspension Assembly frame. A pre-manufactured Motor Driven Cable Reel 34 will be inserted into a Shaft which will be bolted or welded onto Cable Reel Support Structure 35.

FIG. 10 is a front view of U Reclaimer Utility Device Apparatus 45 showing Winch 31, Motor Driven Cable Reel 34, Programmable Logic Controller at Panel 33, and Steel Wire Cable 32. This configuration is a preferred embodiment of a U Reclaimer Utility Device Apparatus 45 of the present invention.

FIG. 11 is a detailed drawing showing Main Hydraulic cylinder 22, Mechanical Brake System 27, Slotted Guide 24, Hydraulic Brake Piston 28 and V-Groove Wheel 25.

FIG. 12 is a side view drawing of U Reclaimer Utility Device Apparatus 45 showing Winch 31, Motor Driven Cable Reel 34, Motors with Encoders 38, Programmable Logic Controller at Panel 33, Elevation Hydraulic Cylinder 21, Main Hydraulic Cylinder 22, and Hydraulic Piston 29. Also shown are Electronic Level Switches with Vibratory Forks 39, 40, 41, and 42.

FIG. 13 is an isometric drawing showing U Reclaimer Utility Device Apparatus 45 to include electronic control components. Motors with Encoders 38 mounted on U Reclaimer Utility Device Apparatus 45 are provided with encoders that send a signal to a Programmable Logic Controller at Panel 33. At the same time, the Programmable Logic Controller at Panel 33 is receiving the position of Motors with Encoders 38 at front and end of U Reclaimer Utility Device Apparatus 45 and activate a Cable Reel 34 in order to coil or un-coil a power cable that feeds Cable Reel 34. The logic programmed in the Programmable Logic Controller at Panel will send signals to Cable Reel 34 rotation direction and speed depending on the position and speed of the Gantry Frame Structure Frame powered by Motors with Encoders 38. As shown in FIG. 13, an X-axis is noted for movement of U Reclaimer Utility Device Apparatus 45 through power provided by Motors with Encoders 38.

FIG. 13 further shows an X & Y axis to note direction in these two axis. A further axis is a Z-axis which is basically vertical movement up and down of Reclaimer Main Structure 1 more aptly shown in FIG. 9. Winch 31 rotates and pulls Steel Wire Cable 32, shown more clearly in FIG. 9, to lift Reclaimer Main Structure or uncoils Steel Wire Cable 32 to lower Reclaimer Main Structure 1. Winch 31 is provided with an electronic encoder that sends a signal to Programmable Logic Controller at Panel 33 to indicate Winch 31 position. Main Hydraulic Cylinders 22, Elevation Hydraulic Cylinders 21, and Hydraulic Pistons 29, more clearly shown in FIG. 9, are provided with linear rheostats that transmit their position to Programmable Logic Controller at Panel 33. Main Reclaimer Structure 1 can be positioned horizontally or inclined per signal commands from Programmable Logic Controller at Panel 33. Height of Reclaimer Main Structure 1 is controlled by signals from Programmable Logic Controller at Panel 33 by activating Elevation Hydraulic Cylinders 21, Main Hydraulic Cylinders 22, and Hydraulic Pistons 29 and Winch 31. Reclaimer Main Structure 1 is also provided with four Electronic Level Switches with Vibratory Forks 39, 40, 41, and 42 that detect end of stroke at lower level of Reclaimer Main Structure 1. Electronic Level Switches with Vibratory Forks 39 and 40 can be calibrated to limit depth of Reclaimer Main Structure 1 into a cement stock pile. Similarly, Electronic Level Switches with Vibratory Forks 42 and 43 are limit switches at the upper position of Reclaimer Main Structure 1. All Electronic Level Switches with Vibratory Forks 39,40,41, and 42 are hard wired to Programmable Logic Controller at Panel 33 which also controls the position of Elevation Hydraulic Cylinders 21, Main Hydraulic Cylinders 22, and Hydraulic Pistons 29 through hydraulic pressure.

FIG. 14 is an isometric drawing of a U Reclaimer Utility Device Apparatus 45 of the present invention in a horizontal cement storage facility showing enclosed air slide 320, enclosed air slide 321, open air slide 322, dust collector 323, screw conveyor 324, and rail 325 to allow movement of U Reclaimer Utility Device Apparatus 45 along horizontal storage housing 91 to reclaim cement stored within.

This invention relates to a material reclaiming machine, more aptly named a U Reclaimer Utility Device Apparatus, for cement handling systems or similar materials and more particularly to a bulk cement storage system reclaiming device of the present invention, a U Reclaimer Utility Device Apparatus, for reclaiming of product from a cement horizontal storage facility or similar material horizontal storage facility. Reclaiming of cement once stored in horizontal storage is performed through use of a mechanical cement reclaiming machine, a U Reclaimer Utility Device Apparatus, of the present invention. Cascaded air slides are used to remove stored material recovered by a U Reclaimer Utility Device Apparatus as described further.

The use of flat storages or warehouses to store cement is a world-wide practice. Even though it is relatively easy to store cement inside a horizontal warehouse using a pneumatic conveying system, the reclaiming of the product has been very problematic, inefficient and costly. Normally the cement is reclaimed from a horizontal warehouse using a fully aerated floor, or introducing a front loader with an operator inside the warehouse, who pushes the material towards an aerated pit. The first reclaiming system mentioned above is expensive and consumed large amount of energy, while the second method is extremely dangerous and is banned by safety agencies.

The origin of flat storage systems is based on the availability of old and unused warehouses at many ports and harbors. Such warehouses are converted into waterproof and airtight enclosures and the cement is pumped in from a ship either through pneumatic ship unloaders, self-unloading ships or bunkers. Cement is also unloaded into storage from railroad cars or cement carrying trucks. The flat storage is an option to building large and expensive cylindrical silos which also take time to build.

The present invention is a new reclaiming device apparatus to efficiently reclaim cement from a horizontal warehouse. This new reclaiming device apparatus, named a U Reclaimer Utility Device Apparatus, provides a means to combine a mechanical cement reclaiming device apparatus, together with a reduced amount of open air slides to reclaim cement or similar material stored in a horizontal storage facility.

Air slide conveyors use the force of gravity to do most of the work without any moving parts. Material is fluidized through a porous media with low pressure air. Material flow is achieved by sloping the Air slide conveyor to match the fluidized angle of repose of the powdered material. At the correct slope, fluidized materials flow with the consistency of a liquid.

Energy requirements of air systems are minimal because only a small volume of air at a low pressure is required to move material once it is reclaimed by a reclaiming device apparatus of the present invention, a U Reclaimer Utility Device Apparatus. Further, the present invention introduces a material reclaiming method, comprised of a U Reclaimer Utility Device Apparatus, a cascade of enclosed air slides, and elevator machines, to convey cement from a reclaiming area to a dispatch hopper.

A U Reclaimer Utility Device Apparatus of the present invention is designed to reclaim material stored in a horizontal storage facility such as a cement horizontal storage facility. Cement is stored between four walls of concrete which forms cement horizontal storage housing. The storage volume between the concrete walls, as well as the height, width and length of each concrete wall depends on the building height and the total capacity of the cement to be stored. To guarantee the evenly distribution of the product between the walls, the total length of the storage area is divided in several sectors, as necessary to cover the entire volume of cement storage housing.

Cement storage housing is divided into several sectors as necessary to cover the entire volume of the cement storage. Each sector is fed by a pneumatic line with several outlets, delivery spouts, arranged transversally (between 5 and 4 outlets). Each outlet is opened and closed by means of two (2) pneumatic operated butterfly valves. The distribution of product to each sector is achieved by means of pneumatic two-way valves, located outside the building. Several limit switches are installed longitudinally on the retaining walls (one for each sector). The limit switches provide a signal to a control room to automatically open and close the pneumatic butterfly valve of a specific outlet and/or to open and close a specific two-way valve of the sector that will be filled with cement.

Cement will be reclaimed by activating (aerating) the open air slides of a specific sector, located adjacent to one of the longitudinal retaining walls of cement storage housing, in combination with a mechanical reclaimer of the present invention, U Reclaimer Utility Device Apparatus 45. The difference of pressure created when an open air slide is activated, produces that the material on the top of the open aeroslide will fall towards the center of each sector. The U Reclaimer Utility Device Apparatus 45 will then keep feeding material towards the open aeroslide of the activated sector. Each sector is activated automatically depending on the position along the horizontal storage facility of U Reclaimer Utility Device Apparatus 45. Either a encoders or several limit switches are arranged along the traveling pad of U Reclaimer Utility Device Apparatus 45. These limit switches will send a signal to a control room, indicating the position of the U Reclaimer Utility Device Apparatus 45, activating the sector where the U Reclaimer Utility Device Apparatus 45 is located.

Once the material above the open aeroslides has been reclaimed, then the U Reclaimer Utility Device Apparatus 45 starts pushing material towards the open aeroslides. U Reclaimer Utility Device Apparatus 45 starts reclaiming of product from the top of the pile, slicing a section of the pile. A Reclaimer Main Structure of FIG. 2 is lowered as long as the product is being reclaimed. The Reclaimer Main Structure of U Reclaimer Utility Device Apparatus 45 may work in an angle, above the angle of repose of cement (30°) to facilitate the reclaiming operations. Once the product of one layer has been totally reclaimed, then the Reclaimer Main Structure is raised and the Gantry Frame Structure travels to reclaim a next slice of the pile. This procedure is repeated to complete the reclaiming of the pile.

U Reclaimer Utility Device Apparatus 45 comprises a Gantry Frame Structure supporting a Reclaimer Main Structure. The operation features of U Reclaimer Utility Device Apparatus 45 are described as follows:

i. Travelling

The Gantry Frame Structure travels along a horizontal storage facility by means of either rails, arranged along outside the longitudinal walls, or rubber tires. Two electrical motors on each side of the Gantry Frame Structure, rotating at the same speed move the Gantry Frame Structure along the horizontal storage facility. The speed of the U Reclaimer Utility Device Apparatus 45 is controlled by a speed control mechanism.

ii. Speed Control

A vibrating sensor attached on the Reclaimer Main Structure indicates if the Gantry Frame Structure is traveling too fast or if the Reclaimer Main Structure is too deep inside the product, reducing the speed of the machine, and adjusting the height of the Reclaimer Arm Structure.

U Reclaimer Utility Device Apparatus 45 is a mechanical reclaiming machine which travels on a Gantry Frame Structure with Gantry Frame Structure supports, the Gantry Frame Structure suspended on wheels which travel on rails on either end of the Gantry Frame Structure. U Reclaimer Utility Device Apparatus 45 mechanically rotates on its length shaving cement piles, delivering cement to open air slides which deliver cement to enclosed air slides which ultimately deliver cement to either vertical conveyors or bucket elevators.

Enclosed and open air slides are provided with air to facilitate movement of cement or similar product. An air line delivers air to a delivery hopper, and enclosed air slides and open air slides to give cement a liquid flow characteristic to facilitate flow of cement through a delivery line After U Reclaimer Utility Device Apparatus 45 shaves product to deliver to open and enclosed air slides, a delivery hopper loads cement into cement carrying trucks. To facilitate accurate flow control of a delivery hopper dispatch system, air slides are designed with computer controlled flow control gates. One flow control gate is installed at the discharge of delivery cement hopper to control the flow rate and another flow control gate is installed at the discharge end of an enclosed air slide to stop flow when a desired weight is attained. Operation is as flows: first a gate at the discharge end of the air slide opens allowing cement to flow from the air slide into the delivery spout. Next, the flow control gate at the supper end of the air slide opens to allow the desired flow rate.

The Gantry Frame Structure supporting U Reclaimer Utility Device Apparatus 45 travels along a horizontal storage facility by means of either rails or rubber tires, transporting Gantry Frame Structure frame on steel flanged wheels arranged along outside the longitudinal walls, or rubber tires. Two electrical geared motors on each side of the Gantry Frame Structure, rotating at the same speed move the Gantry Frame Structure along the horizontal storage facility. The speed of U Reclaimer Utility Device Apparatus 45 is controlled as described further. A vibrating sensor attached on a Reclaimer Main Structure indicates if the Gantry Frame Structure is traveling too fast or if the Reclaimer Main Structure is too deep inside the product, reducing the speed of the machine, and adjusting the height of the Reclaimer Main Structure. Main components of U Reclaimer Utility Device Apparatus 45 are the following:

b) Reclaimer Main Structure Gantry Frame Structure

A Gantry Frame Structure supporting U Reclaimer Utility Device Apparatus 45 travels along the Product Stock Pile by means of rails, transporting Gantry Frame Structure frame on steel flanged wheels arranged along outside the longitudinal walls, or rubber tires.

b) Cable Reel

An electrical driven power cable reel has been arranged on one of the sides of the Gantry Frame Structure. The main power supply cable will be located on the center of a horizontal storage facility, pivoting to either side depending on the position of the U reclaimer. The cable reel motor works in synchronization with traveling geared motors.

c) Hydraulic Pump

A hydraulic power unit has been installed on one of the sides of the Gantry Frame Structure. All movable components that are in direct contact with the product, such as the Reclaimer Main Structure and a reclaiming chain will be preferably driven by means of either hydraulic motors or hydraulic cylinders. However, these components may also be driven using electrical motors.

d) Reclaimer Main Structure Hydraulic Cylinders

The Reclaimer Main Structure is lowered and lifted by means of hydraulic winches, hydraulic cylinders and a combination of both systems. The Reclaimer Main Structure may work inclined towards the open aeroslide to facilitate the product reclaiming operation. Depending on the width of a cement stockyard, it may be necessary to add secondary Reclaimer Main Structures.

e) Reclaimer Main Structure Chain

A Reclaimer Main Structure chain operated by means of a hydraulic motor pushes the material towards an open aeroslide of each sector. The Reclaimer Main Structure has blades attached to a reclaiming chain. The chain runs on channels and has two sprockets on each side of the arm. Four or two hydraulic cylinders are attached to the side of the Reclaimer Main Structure and to the top of the Gantry Frame Structure to avoid the transversal and longitudinal movement when material is being pushed or when the Reclaimer Main Structure touches the side of the pile.

f) Limit Switches and Control

The U Reclaimer Utility Device Apparatus is fully automated. However, the initial positioning of the U Reclaimer Utility Device Apparatus must be performed by an operator using a remote control. Once positioned at the beginning of the pile, then the U Reclaimer Utility Device Apparatus can work completely in automatic mode.

Either encoders or several limit switches have been arranged along a horizontal storage facility to indicate the position of the U Reclaimer Utility Device Apparatus in a cement stockyard horizontal storage facility. Depending of the position of the U Reclaimer Utility Device Apparatus, a specific sector will be activated to initiate the aeration of a sector and the reclaiming of product.

Reclaimer Main Structure winches and cylinders have limit switches to indicate the position and inclination of the Reclaimer Main Structure. A vibrating sensor wire assembled around the Reclaimer Main Structure, indicates if the machine is traveling too fast or if the reclaiming blades are too deep inside the product.

A horizontal storage facility with use of a U Reclaimer Utility Device Apparatus is used for storing large amounts of cement or cementitious materials in horizontal warehouses. Materials which have a consistency similar to cement are adaptable for the use of the present invention. This innovative system of a U Reclaimer Utility Device Apparatus allows use of existing warehouses and enclosures on ports and plants, avoiding the expensive construction of either vertical concrete or steel silos. The operation of a horizontal storage facility, from the stacking of cement up to the reclaiming and dispatching of the product is completely automatic, requiring a minimum of personnel to operate the facility. All equipment employed for operation of a U Reclaimer Utility Device Apparatus can be easily adapted to any specific site condition. The dimensions and capacity of a U Reclaimer Utility Device Apparatus depends on the available space, dimensions of the existing building, the required amount of product to be stored, and the required dispatch capacity.

Among the main characteristics and advantages of a horizontal storage for use of a U Reclaimer Utility Device Apparatus are the following:
  i. Use of a standard warehouse building, with minimal modifications or civil works.
  ii. a horizontal storage facility is designed by introducing an innovative component, the U Cement Reclaimer Utility Device Apparatus of the present invention and a cascade cement distribution system.
  iii. Low Material storage height.
  iv. Stacking and reclaiming of product is fully automatic by use of a U Reclaimer Utility Device Apparatus of the present invention.
  v. A U Reclaimer Utility Device Apparatus is flexible to install and dismantle, requiring a minimum time and investment to put in operation.
  vi. A U Reclaimer Utility Device Apparatus is designed to handle material capacities from 1,000 to 65,000 tons of cement, ideally around 15,000 tons of product.
  vii. A U Reclaimer Utility Device Apparatus can be used to reclaim several products other than cement, with similar consistency.
  viii. Stacking of product may be performed either pneumatically, mechanically or a combination of both systems.
  ix. A horizontal storage facility, with use of a U Reclaimer Utility Device Apparatus allows the handling of multiple cement qualities.
  x. The horizontal storage facility with use of a U Reclaimer Utility Device Apparatus of the present invention eliminates the dangerous operation of front loaders inside a flat horizontal storage.
  xi. The U Reclaimer Utility Device Apparatus is designed to handle capacities up 300 tons per hour for receiving and dispatching cement.

Applications of the U Reclaimer Utility Device Apparatus in a horizontal storage facility:
  i. A U Reclaimer Utility Device Apparatus is adaptable for import marine terminals, in combination with a pneumatic or mechanical ship unloader, with either a pneumatic screw pump or blow pump to store product in a horizontal storage facility.
  ii. The U Reclaimer Utility Device Apparatus is designed for quick installation and dismantling.
  iii. Further, the required civil works for the operation of a horizontal storage facility using a U Reclaimer Utility Device Apparatus are relatively straightforward. Concrete retaining walls may be prefabricated, which may be removed whenever it is needed.
  iv. After finishing the use of a U Reclaimer Utility Device Apparatus, all major components and equipment can be quickly dismantled and moved to a new location.

The U Reclaimer Utility Device Apparatus in use at a horizontal storage facility is designed based on the following premises:

a) Flexibility

A U Reclaimer Utility Device Apparatus in use at a horizontal storage facility is easily expandable to store and handle large amounts and multiple types of cement and cementitious materials.

b) Short Return on Investment and low operation cost
  i. The U Reclaimer Utility Device Apparatus makes optimal use of existing infrastructure.
  ii. A minimum of personnel is required to operate a horizontal storage facility using a U Reclaimer Utility Device Apparatus.

c) Short realization time
  iii. It is possible to use brownfield sites with existing (partial) permits by use of a U Reclaimer Utility Device Apparatus.
  iv. It is possible to use an existing storage facility by a U Reclaimer Utility Device Apparatus.

Components of a Horizontal Storage Facility with Use of a U Reclaimer Utility Device Apparatus:

a) Stacking Equipment
  i. Pneumatic equipment (either screw pump or blow pump). Stacking of cement may be performed using mechanical equipment or a combination of a pneumatic and mechanical equipment for further reclaiming of material with a U Reclaimer Utility Device Apparatus.

ii. Conveying pipe. The conveying line will be estimated based on the conveying capacity and distance to be conveyed for reclaiming of product by a U Reclaimer Utility Device Apparatus.
iii. Two-ways Valves, one for each sector of a horizontal storage facility.
iv. Pneumatic butterfly valves, two for each outlet of a horizontal storage facility.

b) Reclaiming System
i. Cement U Reclaimer Utility Device Apparatus.
ii. Open aeroslides, including steel support structure, aeration pipe, one manual ball valve for each 3 meters of aeroslide section, and two pneumatic butterfly valves for each sector of a horizontal storage facility.
iii. Two aeration blowers for aeration of open aeroslides used in combination with a U Reclaimer Utility Device Apparatus.
iv. Vertical screw conveyors or bucket elevators, one for each sector of a horizontal storage facility.
v. Reclaiming of material by a U Reclaimer Utility Device Apparatus to transition material to enclosed aeroslides from open aeroslides to screw conveyor or bucket elevator, one for each sector of a horizontal storage facility.
vi. Slide gates, one for each sector of a horizontal storage facility.
vii. On-off flow control gate, one for each sector of a horizontal storage facility.
viii. Enclosed aeroslide to convey cement from each sector of a horizontal storage facility to a dispatch system.
ix. Aeration fans for enclosed aeroslides, one for each sector of a horizontal storage facility.
x. Flow Control Gates on-off and manual.

c) Dispatch System after Reclaiming Material with a U Reclaimer Utility Device Apparatus:
i. Cement Hopper with the following accessories: aeration bottom with aeration pipe and blower, safety valve, dust collector, level indicators (high and high-high), safety valves, inspection hatch, baffer box to connect pneumatic conveying line, loading cells, steel support structure, access ladder and handrails. The capacity of the cement hopper may vary depending on the dispatch requirements.
ii. Silo slide gate.
iii. Aeroslide slide gate, flow control gate for regulation and flow control gate on-off and enclosed aeroslide.
iv. Loading spout.
v. Dispatch system to include installation of an optional packing unit.
vi. Dispatch system may be mobile; however, this reduces the delivery hopper capacity to a maximum of 200 tons.

To facilitate accurate flow control of the dispatch system, air slides were designed with computer controlled flow control gates. One is installed at the discharge of delivery cement hopper to control the flow rate and another at the discharge end of an enclosed air slide to stop flow when a desired weight is attained. Operation is as follows:
i. first the gate at the discharge end of the air slide opens allowing cement to flow from the air slide into the delivery spout.
ii. Next, a flow control gate at the upper end of the air slide opens to allow the desired flow rate. When the truck trailer is 85% full the flow control gate closes from 90% to 30%.
iii. Finally, at about 300 pounds of a full load, both gates close. This offset is necessary since suspended dust contained in the spout and spout dust collector will come to rest in the trailer. Since cement flow rate changes with gate settings, temperature, moisture content and flow characteristics, the point at which the gates close must be adjustable.

To assure that truck loading is of correct weight, on scale loading may be used to determine how much cement is in the trailer as it is being loaded. On scale loading requires that a truck be completely on a scale and stopped before and during the loading operation. A computer controls the loading operation. Once a truck is stopped on the scale, a spout computer is programmed from a loadout computer what type of truck and how many hatches are to be filled. Transaction data is stored in a loadout computer until the loading is complete and then is sent to a shipping server.

d) Ancillary Equipment and Control System:
i. Service compressor, including compressed air piping.
ii. Bag house (s), including dedusting pipe (s) and return screw conveyor (s) and rotary valve (s).
iii. Motor Control Center MCC and HMI control system.

e) Computer Control of a Horizontal Storage Facility Using a U Reclaimer Utility Device Apparatus:
i. Computers used in a horizontal storage facility perform both sequential control and feedback control. Programmable logic controllers are used in a U Reclaimer Utility Device Apparatus and in a horizontal storage facility as dedicated microprocessors that replaces hardware components such as timers and drum sequencers used in relay logic type systems. Process control computers process data from network PLC's, instruments and controllers to implement PID control of many individual variables in a horizontal storage facility.
ii. Programmable logic controllers (PLC's) use a processing system to allow for variation of control of inputs and outputs from the various components of a U Reclaimer Utility Device Apparatus. PLC's make use of programmable memory, storing instructions and functions like logic, sequencing, timing, etc. A PLC receives a variety of inputs and returns a variety of logical outputs, the input devices being sensors and output devices being motors, winch, etc. PLC's are optimized for control task and use in a U Reclaimer Utility Device Apparatus.
iii. A Distributed Control configuration is used to control a horizontal storage facility where controllers are distributed throughout the system.
iv. A horizontal storage facility, using a U Reclaimer Utility Device Apparatus, automation structure is comprised of field device instrumentation, programmable logic controllers (PLC's), and a process control computer that processes data from the various PLC's to output logical sequencing to motors and valves of a horizontal storage facility. The various logic levels used are the following:
a. Level 1 is comprised of the various devices and sensors which represent the state of the cement loading or reclaiming process. These devices are switches indicating the position of dampers, gates, or instrumentation devices.
b. Level 2 is comprised of nodes collecting the Level 1 plant information, grouping into related areas and taking logical actions based on this information.
c. Level 3 is a combination of process operations in a horizontal storage facility using a U. Reclaimer Utility Device Apparatus.

Level 1 instruments are Integrated with a fieldbus on the same controller. The implementation of fieldbus for level 1 device integration helps reduce control cabling during control implementation. It also enables a remote configuration of these devices from an integrated control station.

The concept of fieldbus integration is extended to more complex electrical devices like AC drives, MCC and MV switchgear. By establishing fieldbus communication with the MCC and a main computer CPU avoids a need of large control cabling, which otherwise would be required.

Operation of a Horizontal Storage Facility with a U Reclaimer Utility Device Apparatus:

i. Stacking of Cement

The cement is stored between four walls of concrete. The storage volume between the concrete walls, as well as the height, width and length of each concrete wall depends on the building height and the total capacity of the cement to be stored. In order to guarantee the evenly distribution of the product between the walls, the total length of the storage area is divided in several sectors, as necessary to cover the entire volume of the stockyard. Each sector is fed by either a pneumatic line with several outlets arranged transversally (between and 4 outlets). Each outlet is open and close by means of two (2) pneumatic operated butterfly valves. The distribution of product to each sector is achieved by means of pneumatic two-way valves, located outside the a building. Several limit switches are installed longitudinally on the retaining walls (one for each sector). The limit switches provide a signal to the control room to automatically open and close the pneumatic butterfly valve of a specific outlet and/or to open and close a specific two-way valve of the sector that will be filled with cement.

When the product is being stacked the U Reclaimer Utility Device Apparatus will remain outside the flat storage. It is possible to dispatch cement simultaneously with the stacking of product, by pumping cement directly to the cement hopper, bypassing the flat storage.

ii. Reclaiming of Cement

Additional to the concrete walls, a concrete trench of 800 mm wide is built adjacent to one of the longitudinal concrete walls. The height of each trench will depend on the length of each sector. The height of the trench is estimated by dividing the length of the trench by two and then multiplying this value by the tangent of 5°. Inside the trench there will be installed an open aeroslide of 750 mm wide which will be used to reclaim the cement. Each aeroslide will be inclined 5° towards the center of each sector. The open aeroslides are supported by steel structures anchored to the concrete floor. Two identical blowers are used to aerated each open aeroslide sector. The aeration capacity of the blowers is calculated by multiplying 750 mm by the length of each sector divided by 3. This value is then multiplied by 1.5 $m^3/m^2$-min. Each open aeroslide is activated automatically depending on the location of a Cement U Reclaimer Utility Device Apparatus 45 as shown in FIG. 13. Each sector has a manual valve on each section of 3 m open aeroslide, and a pneumatic valve which is automatically operated when a specific sector needs to be aerated.

Cement will be reclaimed by activating (aerating) the open aeroslides of a specific sector, located adjacent to one of the longitudinal retaining walls, in combination with a U Reclaimer Utility Device Apparatus. The difference of pressure created when an open aeroslide is activated, produces that the material on the top of the open aeroslide will fall towards the center of each sector. The U Reclaimer Utility Device Apparatus will then keep feeding material towards the open aeroslide of the activated sector. Each sector is activated automatically depending on the position U Reclaimer Utility Device Apparatus in the horizontal storage facility. The position of the U Reclaimer Utility Device Apparatus is monitored by either encoders or several limit switches arranged along the traveling pad of the U Reclaimer Utility Device Apparatus. These limit switches will send a signal to the control room, indicating the position of the U Reclaimer Utility Device Apparatus, activating the sector where the U Reclaimer Utility Device Apparatus is located at.

Once the material above the open aeroslides has been reclaimed, then the U Reclaimer Utility Device Apparatus starts pushing material towards the open aeroslides. The U Reclaimer Utility Device Apparatus starts reclaiming of product from the top of the pile, slicing a section of the pile. A Reclaimer Main Structure as shown in FIG. 2 is lowered as long as the product is being reclaimed. The Reclaimer Main Structure 1 may work in angle, above the angle of repose of cement (30°) to facilitate the reclaiming operations. Once the product of one layer has been totally reclaimed, then the Reclaimer Main Structure 1 is raised and the Gantry Frame Structure travels to reclaim a next slice of the pile. This procedure is repeated to complete the reclaiming of the pile.

iii. U Reclaimer Utility Device Apparatus of a Horizontal Storage Facility:

The U Reclaimer Utility Device Apparatus comprises a Gantry Frame Structure supporting a Reclaimer Main Structure. The main features of the U Reclaimer Utility Device Apparatus are described as follows:

a) Travelling

The Gantry Frame Structure travels along a horizontal storage facility by means of either rails, arranged along outside the longitudinal walls, or rubber tires. Two electrical motors on each side of the Gantry Frame Structure, rotating at the same speed move the Gantry Frame Structure along the horizontal storage facility. The speed of the U Reclaimer Utility Device Apparatus is fixed. A vibrating sensor attached on a Reclaimer Main Structure indicates if the Gantry Frame Structure is traveling too fast or if the Reclaimer Main Structure is too deep inside the product, reducing the speed of the machine, and adjusting the height of the Reclaimer Main Structure.

b) Cable Reel

An electrical driven cable reel has been arranged on one of the sides of the Gantry Frame Structure. The main power supply cable will be located on the center of the horizontal storage facility, pivoting to either side depending on the position of the U Reclaimer Utility Device Apparatus. The cable reel motor works in synchronization with the traveling motors.

c) Hydraulic Pump

A hydraulic pump has been arranged to one of the sides of the Gantry Frame Structure of a U Reclaimer Utility Device Apparatus. All movable components that are in direct contact with the product, such as the Reclaimer Main Structure which and the reclaiming chain will be preferably driven by means of either hydraulic motors or hydraulic cylinders. However, these components may also be driven using electrical motors.

d) Reclaimer Main Structure Hydraulic Cylinders

The Reclaimer Main Structure is lowered and lifted by means of hydraulic winches, hydraulic cylinders and a combination of both systems. The Reclaimer Main Structure may work inclined towards the open aeroslide to facilitate the product reclaiming operation. Depending on the width of the stockyard, it may be necessary to add secondary Reclaimer Main Structures.

e) Reclaimer Main Structure

A reclaiming chain operated by means of a hydraulic motor pushes the material towards the an open aeroslide of each sector. The Reclaimer Main Structure has blades attached to a reclaiming chain. The chain runs on channels and has two sprockets on each side of the arm. Four or two hydraulic cylinders are attached to the side of the Reclaimer Main Structure and to the top of the Gantry Frame Structure to avoid the transversal and longitudinal movement of the arm when the material is being pushed or when the machine touches the side of the pile.

f) Limit Switches and Control
  i. The U Reclaimer Utility Device Apparatus is fully automated. However, the initial positioning of the machine must be performed by an operator using a remote control. Once the machine has been positioned at the beginning of the pile, then the U Reclaimer Utility Device Apparatus can work completely in automatic mode.
  ii. Either encoders or several limit switches have been arranged along the horizontal storage facility to indicate the position of the U Reclaimer Utility Device Apparatus on the stockyard of a horizontal storage facility. Depending of the position of the machine, a specific sector will be activated to initiate the aeration of a sector and the reclaiming of product.
  iii. The Reclaimer Main Structure winches and cylinders have limit switches to indicate the position and inclination of the Reclaimer Main Structure.
  iv. Vibrating sensor wire arranges around the Reclaimer Main Structure, indicates if the machine is traveling too fast or if the reclaiming blades are too deep inside the product.
  v. A CCTV system may be installed on the U Reclaimer Utility Device Apparatus to monitor the proper operation of the entire system.

iv. Cascade Cement Distribution Arrangement

The product is conveyed by open aeroslides to the center of each sector to an enclosed aeroslide. Each enclosed aeroslide has a manual slide gate and an On-Off flow control gate electrically operated. The enclosed aeroslide, the slide gates and the on-off flow control gate are aerated by a blower assigned to the sector that is being activated. The enclosed aeroslide feeds either a screw conveyor or a bucket elevator. Except for the central sector, which feeds directly the dispatch hopper, the screw conveyor or bucket elevator will convey the cement to an enclosed aeroslide. The enclosed aeroslides of the sectors adjacent to the dispatch hopper discharges the product directly to the bottom of a dispatch hopper feeding screw conveyor or bucket elevator. While the enclose aeroslides of the sectors located farthest from the dispatch hopper feed the screw conveyor or bucket elevator of the adjacent sector. This system is named a Cascade Cement Distribution Arrangement, and it has been designed specifically for the operation of the horizontal storage facility with a U Reclaimer Utility Device Apparatus of the present invention to reduce the height of the screw conveyor or bucket elevators of the sectors located farther away from the dispatch hopper.

v. Dispatch Area

The dispatch area is composed of a buffer hopper or silo with enough capacity to guarantee the continuous dispatch of cement from a terminal of the horizontal storage facility. The buffer hopper has an aerated cone, a slide gate, and discharge the product to an enclosed aeroslide. The discharge system has a manual slide gate, a flow control gate and an On-off flow control gate. The trucks are loaded by means of a retractable loading spout with a level limit switch. The buffer hopper is supported by load cells, to keep track of the tonnage being dispatched. Inside the buffer hopper, there will be two level indicators for high and high-high level of product. The material may be conveyed directly to a surge bin without passing through the flat storage. For this purpose, a baffer box has been installed to reduce the speed of material. The buffer hopper also has a safety valve, as well as a Dust collector.

vi. Ancillary Equipment
  a. Dust Collector
  A horizontal storage facility with use of a U Reclaimer Utility Device Apparatus is supplied with the necessary dust collecting system to guarantee the proper control of dust at the transfer points and dissipation of air wherever it is required. The dust collectors are calculated based on the air generated by the air compressors, blowers and fans.
  b. Service Compressed Plant
  An air compressed unit will be supplied for the operation of all pneumatic valves, and cleaning of dust collectors.
  c. Control Room
  A horizontal storage facility with use of a U Reclaimer Utility Device Apparatus is supplied with the necessary MCC cabinets for all electrical motors, as well as HMI to control the operation of the stacking, reclaiming and dispatching of cement.

vii. Advantages of a Horizontal Storage Facility with a U Reclaimer Utility Device Apparatus:
  i. The horizontal storage facility with a U Reclaimer Utility Device Apparatus is an option to automatically store, reclaim and dispatch large amount of cement or cementitious materials, using horizontal warehouses.
  ii. A horizontal storage facility with a U Reclaimer Utility Device Apparatus allows reclaiming of cement from the storage area without the dangerous practice of using an operator inside a front loader
  iii. A horizontal storage facility with a U Reclaimer Utility Device Apparatus substantially reduces the number of aeration pads inside a flat storage to perform the reclaiming of cement, and consequently energy consumption.
  iv. A U Reclaimer Utility Device Apparatus of the present invention in combination with cascade cement distribution facilitates the storage of cement or other material in existing warehouses and reclaiming of material in an efficient manner. These two new components, together with the traditional pneumatic conveying system for stacking cement, the open aeration pads to reclaim the cement from a flat warehouse, and the typical dispatch system, has been integrated to create an efficient method to handle large quantities of cement. If the strength of the building's columns allows it, the travelling rails for the Gantry Frame Structure supports may be installed directly attached to the building columns.

Another variation of the reclaimer may consider that the Gantry Frame Structure rails may be installed on the top of the side retaining walls. In this case the concrete retaining walls must be designed with the necessary strength to support the dynamic and static loads resulting of the Gantry Frame Structure operation.

What is claimed is:

1. A reclaimer device to reclaim cement from a cement storage facility by scraping layers of said cement from a cement pile to a dispatch area, said reclaimer device comprising:
   a plurality of scrapers mounted on a reclaiming chain, said chain configured to loop from a front end to a rear end;
   mechanical means to circulate said reclaiming chain;
   a gantry comprising a front end and a rear end to support said reclaiming chain;
   a cable configured to be mounted on top of said gantry;
   said cable configured to be connected to the front end of said reclaiming chain;
   mechanical means to lift or lower said cable;
   at least one hydraulic cylinder configured to be connected to the top of said gantry;
   said hydraulic cylinder configured to be connected to said rear end of said reclaiming chain;
   mechanical means to extend or contract said hydraulic cylinder;
   a plurality of wheels supporting said gantry;
   mechanical means to turn said wheels;
   automated means to control said mechanical means to turn said wheels;
   automated means to control lifting or lowering of said cable;
   automated means to control extending or contracting of said hydraulic cylinder;
   electronic means to determine a position of said gantry on said cement pile; and
   electronic means to determine a position of said reclaiming chain on said cement pile.

2. A reclaimer device as in claim 1 wherein said reclaiming chain is configured to be supported by structural members to support said chain and mechanical means to circulate said reclaiming chain.

3. A reclaimer device as in claim 2 wherein said mechanical means to circulate said reclaiming chain comprises an electrical motor coupled to a sprocket wheel, said sprocket wheel engaging said reclaiming chain thereby circulating said chain.

4. A reclaimer device as in claim 3 wherein said reclaiming chain is configured to circulate said scrapers onto said cement pile to move cement to said dispatch area by movement of said gantry across the cement pile, said reclaiming chain configured to be lowered onto the cement pile as the gantry moves across said cement pile, the scrapers thereby moving a layer of cement.

5. A reclaimer device as in claim 1 wherein said mechanical means to lift or lower said cable comprises an electrical driven cable reel.

6. A reclaimer device as in claim 5 wherein said automated means to control lifting or lowering of said cable comprises a programmable logic controller programmed and configured to transmit electronic signals to either run or stop said cable reel.

7. A reclaimer device as in claim 1 wherein said mechanical means to extend or contract said hydraulic cylinder comprises a hydraulic power unit with hoses connected to said hydraulic cylinder.

8. A reclaimer device as in claim 7 wherein said reclaiming chain is configured to move onto the cement pile by extending said cable lower and extending said hydraulic cylinder wherein the reclaiming chain makes contact at the height of the cement pile and said gantry moves forward bringing a layer of the cement pile to said dispatch area.

9. A reclaimer device as in claim 7 wherein said automated means to control extending or contacting of said hydraulic cylinder comprises a programmable logic controller programmed and configured to send electrical signals to run or stop said hydraulic power unit and to extend or contract said hydraulic cylinder.

10. A reclaimer device as in claim 1 wherein said mechanical means to turn said wheels comprises at least one electrical motor coupled to at least one wheel of said gantry.

11. A reclaimer device as in claim 10 wherein said gantry is configured to travel from a rear end to a front end of the cement pile with said reclaiming chain scraping a layer of cement, wherein when said gantry reaches the front end of said cement pile said gantry is then configured to lift the reclaiming chain off the cement pile by raising the cable and contracting the hydraulic cylinder and said gantry is then configured to return to the rear end of said cement pile and configured to lower the lifting cable and extend the hydraulic cylinder thereby lowering said reclaiming chain onto the cement pile to make another scraping run.

12. A reclaimer device as in claim 11 wherein said electronic means to determine a position of said gantry on said cement pile comprises a plurality of electronic switches mounted on the bottom of said gantry, wherein said switches are configured to close contacts when said gantry is on top of said cement pile, and open said contacts when there is no more cement, said switches electrically connected to a programmable logic controller.

13. A reclaimer device as in claim 11 wherein said electronic means to determine a position of said reclaiming chain on said cement pile comprises a plurality of electronic switches to close contacts when said chain is on top of said cement pile, and open contacts when there is no more cement, said switches electrically connected to a programmable logic controller.

14. A reclaimer device as in claim 10 wherein said automated means to control the mechanical means to turn said wheels on said gantry comprises a programmable logic controller electrically connected to at least one electrical motor coupled to at least one wheel on said gantry, wherein said controller is programmed and configured to transmit electronic signals to start or stop said electrical motor and to reverse rotation of said motor.

* * * * *